US009426333B2

(12) United States Patent
Arai et al.

(10) Patent No.: US 9,426,333 B2
(45) Date of Patent: Aug. 23, 2016

(54) ILLUSION ANALYZING APPARATUS, APPARATUS FOR GENERATING ILLUSION-CONSIDERED IMAGE FOR WHICH ILLUSION IS TAKEN INTO CONSIDERATION TO ALLOW PERCEPTION ACCORDING TO ORIGINAL IMAGE, ILLUSION ANALYZING METHOD, METHOD OF GENERATING ILLUSION-CONSIDERED IMAGE FOR WHICH ILLUSION IS TAKEN INTO CONSIDERATION TO ALLOW PERCEPTION ACCORDING TO ORIGINAL IMAGE, AND PROGRAM

(71) Applicant: Japan Science and Technology Agency, Kawaguchi-shi, Saitama (JP)

(72) Inventors: Hitoshi Arai, Tokyo (JP); Shinobu Arai, Tokyo (JP)

(73) Assignee: Japan Science and Technology Agency, Kawaguchi-shi, Saitama (JP)

( * ) Notice: Subject to any disclaimer, the term of this patent is extended or adjusted under 35 U.S.C. 154(b) by 0 days.

(21) Appl. No.: 14/431,583

(22) PCT Filed: Sep. 30, 2013

(86) PCT No.: PCT/JP2013/077190
§ 371 (c)(1),
(2) Date: Mar. 26, 2015

(87) PCT Pub. No.: WO2014/051169
PCT Pub. Date: Apr. 3, 2014

(65) Prior Publication Data
US 2015/0264222 A1  Sep. 17, 2015

(30) Foreign Application Priority Data
Sep. 28, 2012  (JP) .................... 2012-216718

(51) Int. Cl.
*H04N 1/60* (2006.01)
*G06T 11/60* (2006.01)
(Continued)

(52) U.S. Cl.
CPC .............. *H04N 1/6005* (2013.01); *G06T 5/009* (2013.01); *G06T 5/10* (2013.01); *G06T 5/20* (2013.01);
(Continued)

(58) Field of Classification Search
CPC ....... G06T 11/001; G06T 11/60; G06T 5/009; G06T 5/10; G06T 5/20; G06T 2207/10024; G06T 2207/20016; G06T 11/003; G06T 2207/20024; G06T 2207/20064; H04N 1/6005; B44F 1/00; A01B 12/006
USPC .................................................. 382/167, 260
See application file for complete search history.

(56) References Cited

U.S. PATENT DOCUMENTS 8,301,013 B2 * 10/2012 Yamashita ......... H04N 13/0029
348/51
8,873,879 B2 * 10/2014 Arai ...................... G06T 11/003
382/260

(Continued)

FOREIGN PATENT DOCUMENTS

JP  2009-296039 A   12/2009
WO  2012/067254    5/2012
WO  2012/067254 A1   5/2012

OTHER PUBLICATIONS

Hitoshi Arai, "Mathematical Models of Visual Information Processing in the Human Brain and Applications to Visual Illusions and Image Processing", K. Anjyo (ed.), Mathematical Progress in Expressive Image Synthesis I, Springer , Japan 2014,7 pages.*

(Continued)

*Primary Examiner* — Mekonen Bekele
(74) *Attorney, Agent, or Firm* — Amster, Rothstein & Ebenstein, LLP

(57) ABSTRACT

According to the present invention, multiresolution decomposition is performed on a color component of image data by using a wavelet frame with orientation selectivity or a filter bank with orientation selectivity and subband signals are obtained; and when reconstructing an image by summing the obtained subband signals, coefficient processing is performed, between a decomposition phase and a synthesis phase in the multiresolution decomposition, on decomposition detail coefficients that are output from the decomposition phase such that the larger the energy of the decomposition detail coefficients is, the more small values are further reduced, and the smaller the energy of the decomposition detail coefficients is, the more small values are increased, or vise versa.

25 Claims, 28 Drawing Sheets

(51) Int. Cl.
*G06T 5/10* (2006.01)
*G06T 5/00* (2006.01)
*G06T 5/20* (2006.01)
*G06T 11/00* (2006.01)

(52) U.S. Cl.
CPC .............. *G06T 11/001* (2013.01); *G06T 11/60* (2013.01); *G06T 2207/10024* (2013.01); *G06T 2207/20016* (2013.01); *G06T 2207/20064* (2013.01)

(56) References Cited

U.S. PATENT DOCUMENTS

| | | | | |
|---|---|---|---|---|
| 2009/0273843 | A1* | 11/2009 | Raskar | G02B 27/0018 359/601 |
| 2009/0297025 | A1 | 12/2009 | Murayama et al. | |
| 2015/0055885 | A1* | 2/2015 | Arai | G06T 11/003 382/260 |
| 2015/0131906 | A1* | 5/2015 | Arai | G06T 5/20 382/167 |

OTHER PUBLICATIONS

Japanese Patent Office, "International Search Report", issued in International Application No. PCT/JP2013/077190 mailed on Dec. 3, 2013, 2 pages.

Hitoshi Arai, "Sakushizuhansyuu (Illusion Patterns collection)", Sanshusha Co., Ltd., pp. 1-35, Oct. 25, 2007, 55 pages.

Hitoshi Arai and Shinobu Arai, "2D tight framelets with orientation selectivity suggested by vision science", JSIAM Letters, vol. 1, pp. 9-12 (2009).

Hitoshi Arai and Shinobu Arai, "Finite Discrete, Shift-Invariant, Directional Filterbanks for Visual Information Processing, I : Construction", Interdisciplinary Information Sciences, vol. 13, No. 2, pp. 255-273 (2007).

Elizabeth N. Johnson et al., "The spatial transformation of color in the primary visual cortex of the macaque monkey", Nature Neuroscience, vol. 4, No. 4, pp. 409-416 (Apr. 2001), Nature Publishing Group.

Japan Patent Office, "Office Action—Notice of Rejection", issued in Japan Patent Application No. JP 2014-514661, mailed on Jun. 10, 2014, 5 pages (4 pages of translation of Office Action and 1 page of Office Action).

Hitoshi Arai, "Senkei Daisuu Kiso to Ouyou Linear Algebra Basic Theory and Applications", Nippon Hyoron-Sha Co., Ltd., pp. 4-7, 18-19, 278-279, 332-333 and 344-347 (2006), 9 pages.

Hitoshi Arai, "Science and Mathematics of Vision: World of Optical Illusions Explored with Wavelets—Third Installment: Nonlinear Mathematical Models of Vision and Simulation of Occurrence of Optical Illusions", Mathematical Sciences, No. 544, pp. 63-68 (Oct. 2008), 27 pages.

Toyonaka Hirai et al., "Formulation and Measurement of the Geometrical Optical Illusion Magnitude in Relation to the Effect of the Surround Lines Upon the Viewed Test-Line", Transactions of the Society of instrument and Control Engineers, vol. 37, No. 7, pp. 675-680, (Jul. 31, 2001).

Hitoshi Arai, "Science and Mathematics of Vision: World of Illusions through Wavelet, Final Article, Perception of Color and Illusion", Mathematical Sciences, No. 547, pp. 75-79 (Jan. 2009), 20 pages.

Hitoshi Arai, Science and Mathematics of Vision: Exploring the World of Illusion with Wavelet, Mathematical Sciences, No. 542, pp. 64-69 (Aug. 2008), 21 pages.

European Patent Office, "Supplementary European Search Report", for International Application No. PCT/JP2013/077190 dated May 10, 2016.

Hitoshi Arai, "A Nonlinear Model of Visual Information Processing Based on Discrete Maximal Overlap Wavelets", Interdisciplinary Information Sciences, vol. 11, No. 2, pp. 177-190, (2005).

Xavier Otazu, et al., "Toward a Unified Chromatic Induction Model", Journal of Vision, vol. 10, No. 12, pp. 5-5, (Oct. 5, 2010).

Naila Murray, et al., "Saliency Estimation Using a Non-Parametric Low-Level Vision Model", Computer Vision and Pattern Recognition (CVPR), 2011 IEEE Conference on, IEEE, pp. 433-440, (Jun. 20, 2011).

* cited by examiner

FIG.5

| $d_k(1)$ | $d_k(2)$ | $d_k(3)$ | $d_k(4)$ | $d_k(5)$ | $d_k(6)$ | $d_k(7)$ | $a_k$ |
|---|---|---|---|---|---|---|---|
| $d_k(8)$ | $d_k(9)$ | $d_k(10)$ | $d_k(11)$ | $d_k(12)$ | $d_k(13)$ | $d_k(14)$ | $d_k(15)$ |
| $d_k(16)$ | $d_k(17)$ | $d_k(18)$ | $d_k(19)$ | $d_k(20)$ | $d_k(21)$ | $d_k(22)$ | $d_k(23)$ |
| $d_k(24)$ | $d_k(25)$ | $d_k(26)$ | $d_k(27)$ | $d_k(28)$ | $d_k(29)$ | $d_k(30)$ | $d_k(31)$ |
| $d_k(32)$ | $d_k(33)$ | $d_k(34)$ | $d_k(35)$ | $d_k(36)$ | $d_k(37)$ | $d_k(38)$ | $d_k(39)$ |
| $d_k(40)$ | $d_k(41)$ | $d_k(42)$ | $d_k(43)$ | $d_k(44)$ | $d_k(45)$ | $d_k(46)$ | $d_k(47)$ |
| $d_k(48)$ | $d_k(49)$ | $d_k(50)$ | $d_k(51)$ | $d_k(52)$ | $d_k(53)$ | $d_k(54)$ | $d_k(55)$ |
| $d_k(56)$ | $d_k(57)$ | $d_k(58)$ | $d_k(59)$ | $d_k(60)$ | $d_k(61)$ | $d_k(62)$ | $d_k(63)$ |

| $d_k(64)$ | $d_k(65)$ | $d_k(66)$ | $d_k(67)$ | $d_k(68)$ | $d_k(69)$ |
|---|---|---|---|---|---|
| $d_k(70)$ | $d_k(71)$ | $d_k(72)$ | $d_k(73)$ | $d_k(74)$ | $d_k(75)$ |
| $d_k(76)$ | $d_k(77)$ | $d_k(78)$ | $d_k(79)$ | $d_k(80)$ | $d_k(81)$ |
| $d_k(82)$ | $d_k(83)$ | $d_k(84)$ | $d_k(85)$ | $d_k(86)$ | $d_k(87)$ |
| $d_k(88)$ | $d_k(89)$ | $d_k(90)$ | $d_k(91)$ | $d_k(92)$ | $d_k(93)$ |
| $d_k(94)$ | $d_k(95)$ | $d_k(96)$ | $d_k(97)$ | $d_k(98)$ | $d_k(99)$ |

ORIGINAL IMAGE A    ORIGINAL IMAGE B

ORIGINAL IMAGE (INNER SQUARE PART)

PROCESSED IMAGE A    QUANTIFY DIFFERENCE    PROCESSED IMAGE B

ORIGINAL IMAGE E          ORIGINAL IMAGE F

FIG.15
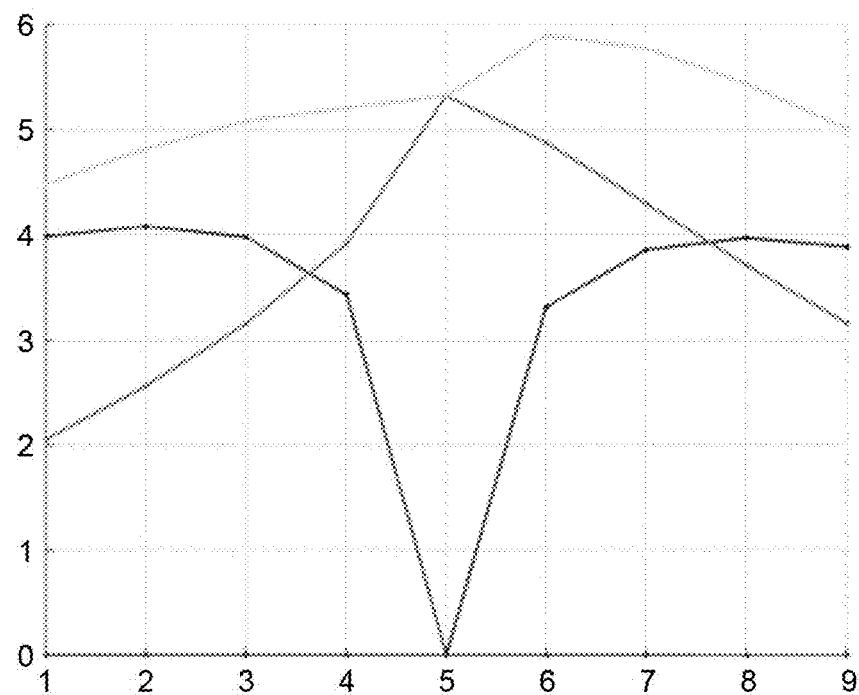
BLACK —: |(L* VALUE AT CENTER OF ORIGINAL IMAGE)
              −(L* VALUE AT CENTER OF PROCESSED IMAGE)|
RED    —: |(a* VALUE AT CENTER OF ORIGINAL IMAGE)
              −(a* VALUE AT CENTER OF PROCESSED IMAGE)|
BLUE   —: |(b* VALUE AT CENTER OF ORIGINAL IMAGE)
              −(b* VALUE AT CENTER OF PROCESSED IMAGE)|
GREEN —: $((\text{BLACK POINT})^2+(\text{RED POINT})^2+(\text{BLUE POINT})^2)^{1/2}$
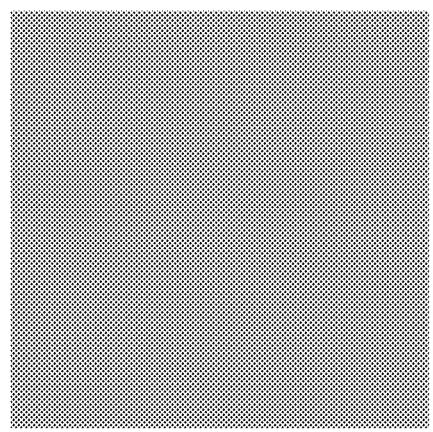
COLOR OF SMALL SQUARE OF ORIGINAL IMAGE
(COMMON AMONG 1 TO 9)

| | LIGHTNESS IS UNIFORM IN LARGE SQUARE AND SMALL SQUARE | COLOR OF SMALL SQUARE | LIGHTNESS DIFFERS BETWEEN LARGE SQUARE AND SMALL SQUARE |
|---|---|---|---|
| ORIGINAL IMAGE | GRAY OF SMALL SQUARE LOOKS SLIGHTLY REDDISH | COLOR OF SMALL SQUARES OF TWO ORIGINAL IMAGES | GRAY OF SMALL SQUARE LOOKS SLIGHTLY LIGHT BUT NOT REDDISH |
| GRAPH OF CENTER CROSS SECTION OF ORIGINAL IMAGE | BLACK:L* RED:a* BLUE:b* | | BLACK:L* RED:a* BLUE:b* |
| PROC- ESSED IMAGE | | | |
| GRAPH OF CENTER CROSS SECTION OF PROC- ESSED IMAGE | BLACK:L* RED:a* BLUE:b* | | BLACK:L* RED:a* BLUE:b* |
| SMALL SQUARE OF PROC- ESSED IMAGE | | | |

FIG.22 COLOR CONTRAST ILLUSION

ILLUSION ANALYZING APPARATUS, APPARATUS FOR GENERATING ILLUSION-CONSIDERED IMAGE FOR WHICH ILLUSION IS TAKEN INTO CONSIDERATION TO ALLOW PERCEPTION ACCORDING TO ORIGINAL IMAGE, ILLUSION ANALYZING METHOD, METHOD OF GENERATING ILLUSION-CONSIDERED IMAGE FOR WHICH ILLUSION IS TAKEN INTO CONSIDERATION TO ALLOW PERCEPTION ACCORDING TO ORIGINAL IMAGE, AND PROGRAM

This application is a National Stage entry under 35 U.S.C. 371 of International Patent Application No. PCT/JP2013/077190, filed on Sep. 30, 2013, which claims the benefit of and priority to Japanese Patent Application No. 2012-216718, filed on Sep. 28, 2012, the entire contents of each of which are incorporated by reference herein.

FIELD

The present invention relates to an illusion analyzing apparatus, an illusion-considered image generating apparatus, an illusion analyzing method, an illusion-considered image generating method, and a program.

BACKGROUND

Patterns that cause contrast illusions have been found (see Non Patent Literature 1). In the 19th century, Chevreul, a chemist, who undertook the directorship of dye works at the French royal Gobelins Manufactory noticed that, even when gobelins were manufactured with a color scheme designed according to the requests, they looked different from the requests. When we look at an illusion pattern of Chevreul illusion or the like, an illusion is caused where, for example, we perceive colors, lightness, etc. differently from the actual ones or see an object that does not actually exist.

According to the method described in Non Patent Literature 2, it is disclosed that a maximal overlap biorthogonal wavelet filter bank is used as a mathematical model of human early visual information processing to perform non-linear processing on the original image. Furthermore, pinwheel wavelet frames (see Non Patent Literature 4), simple pinwheel framelets (see Non Patent Literature 3), and wavelet frames with orientation selectivity that are referred to as pinwheel framelets have been developed as mathematical models of simple cells of human visual cortex, and they are used for image analysis, etc. Neuroscience experimental results representing that the human visual system has cells of color and lightness in the cerebral cortex have been reported (see Non Patent Literature 5).

CITATION LIST

Non Patent Literature

Non Patent Literature 1: Hitoshi Arai. *Sakushizuhansyuu* (Illusion Patterns collection), Sansyuusya, 2007.

Non Patent Literature 2: Hitoshi Arai, "A Nonlinear Model of Visual Information Processing Based on Discrete Maximal Overlap Wavelets", Interdisciplinary Information Sciences, Vol. 11, No. 2, pp. 177-190 (2005).

Non Patent Literature 3: Hitoshi Arai and Shinobu Arai, 2D tight framelets with orientation selectivity suggested by vision science, JSIAM Letters Vol. 1, pp. 9-12 (2009).

Non Patent Literature 4: Hitoshi Arai and Shinobu Arai, Finite discrete, shift-invariant, directional filter banks for visual information processing, I: construction, Interdisciplinary Information Sciences, Vol. 13, No. 2, pp. 255-273 (2007).

Non Patent Literature 5: E. N. Johnson, M. J. Hawken and R. Shapley, The spatial transformation of color in the primary visual cortex of the macaque monkey, Nature Neuroscience, Vol. 4, No. 4, pp. 409-416 (2001).

SUMMARY

Technical Problem

There has been, however, a problem in that how the image actually looks depends on the person's subjectivity and cannot be quantified. Particularly, there has been a problem in that, even when a person, such as an industrial designer for automobiles or an interior designer for buildings, who designs a color scheme notices that it does not necessarily look as the designer intends to the customer, the person only adjusts the color scheme depending on the techniques acquired through professional experiences.

The present invention was made in view of the above-described problem, and an objective of the present invention is to provide an illusion analyzing apparatus, an illusion-considered image generating apparatus, an illusion analyzing method, an illusion-considered image generating method, and a program.

Solution to Problem

In order to achieve the objective, we considered as follows as a result of earnest examinations and completed the invention. Specifically, the human visual system originally performs information processing to look carefully at a part we want to see. A human being perceives various illusions and it is considered that they result from visual information processing. A calculator implementing a mathematical model should calculate illusions if the mathematical model is close to the human visual information processing. Thus, by using a mathematical model obtained by simulating a lightness contrast illusion or a color contrast illusion, we performed information processing close to the human visual system on an original image to create an image that is perceived in the human brain, found that the image can be quantified by comparing the image and the original image, and completed the invention herein. It also has become possible to obtain, on the same principle, an image for which an amount of illusion previously added in the human visual information processing is taken into consideration (illusion-considered image) to allow perception according to the original image in the human brain.

According to an aspect of the present invention, an illusion analyzing apparatus includes at least a storage unit and a control unit, the storage unit includes: a filter storage unit that stores a wavelet frame with orientation selectivity or a filter bank with orientation selectivity that is a set of an approximate filter with no orientation and a plurality of detail filters with respective orientations; and an image data storage unit that stores image data; the control unit includes: a decomposing unit that performs multiresolution decomposition on a color component of the image data by using the wavelet frame with orientation selectivity or the filter bank with orientation selectivity and obtains subband signals; a reconstructing unit that reconstructs an image by summing the subband signals that are obtained by the decomposing unit and obtains reconstructed image data; and an illusion quantifying unit that quantifies an amount of illusion by calculating a ratio or difference in the color component between the image data and the reconstructed image data; and the decomposing unit further includes a coefficient processing unit that performs, between a decomposition phase and a synthesis phase in the multiresolution decomposition, coefficient processing on decomposition detail coefficients that are output from the decomposition phase such that the larger the energy of the decomposition detail coefficients is, the more small values are further reduced, and the smaller the energy of the decomposition detail coefficients is, the more small values are increased.

According to another aspect of the present invention, in the illusion analyzing apparatus described above, the coefficient processing unit performs independent processing according to a difference in the sign of the decomposition detail coefficients.

According to still another aspect of the present invention, in the illusion analyzing apparatus described above, the color component is any one of $L^*$, $a^*$ and $b^*$ of a CIELAB color space.

According to still another aspect of the present invention, in the illusion analyzing apparatus described above, the illusion amount quantifying unit calculates the amount of illusion by using a color difference that is a square-root of sum of squares of differences in the values of $L^*$, $a^*$ and $b^*$ between the image data and the reconstructed image data.

According to still another aspect of the present invention, in the illusion analyzing apparatus described above, the coefficient processing unit performs, for color components of $a^*$ and/or $b^*$ of the image data, the coefficient processing that is corrected such that the larger the energy that is determined from the decomposition detail coefficients of $a^*$ and/or $b^*$ and the decomposition detail coefficients of $L^*$ is, the more small values are further reduced, and the smaller the energy is, the more small values are increased.

According to still another aspect of the present invention, in the illusion analyzing apparatus described above, the coefficient processing unit performs the coefficient processing using a function that automatically varies continuously in an S-shaped curve when the energy of the decomposition detail coefficients is large, and in an N-shaped curve when the energy is small.

According to still another aspect of the present invention, in the illusion analyzing apparatus described above, the coefficient processing unit normalizes, between the decomposition phase and the synthesis phase, the decomposition detail coefficients, uses, as the energy, a norm of normalized decomposition detail coefficients that are obtained by normalizing the decomposition detail coefficients, performs the coefficient processing on the normalized decomposition detail coefficients, and performs inverse operations of the normalization on the normalized decomposition detail coefficients on which the coefficient processing has been performed.

According to still another aspect of the present invention, in the illusion analyzing apparatus described above, the decomposing unit performs the multiresolution decomposition using a biorthogonal wavelet filter bank with horizontal, vertical and diagonal orientations or a pinwheel framelet with multiple orientations.

According to still another aspect of the present invention, in the illusion analyzing apparatus described above, the decomposing unit uses another filter bank by at least changing the degree of the pinwheel framelet according to the level.

According to still another aspect of the present invention, in the illusion analyzing apparatus described above, the multiresolution decomposition performed by the decomposing unit is maximal overlap multiresolution decomposition, maximally decimated multiresolution decomposition, or partially decimated and partially overlapping multiresolution decomposition.

According to still another aspect of the present invention, in the illusion analyzing apparatus described above, the control unit further includes an image editing unit that edits the image data and performs control such that the decomposing unit performs the multiresolution decomposition on the edited image data, the illusion amount quantifying unit calculates, as the amount of illusion, a ratio or difference between the reconstructed image data obtained from the edited image data and the image data that is unedited, and the image editing unit repeatedly performs editing such that the amount of illusion is reduced.

According to still another aspect of the present invention, in the illusion analyzing apparatus described above, the control unit further includes an image editing unit that edits the image data and performs control such that the decomposing unit performs the multiresolution decomposition on the edited image data, the illusion amount quantifying unit calculates, as the amount of illusion, a ratio or difference between the edited image data and the reconstructed image data obtained from the edited image data, and the image editing unit repeatedly performs editing such that the amount of illusion is at a given numerical value.

According to still another aspect of the present invention, an illusion-considered image generating apparatus includes at least a storage unit and a control unit, the storage unit includes: a filter storage unit that stores a wavelet frame with orientation selectivity or a filter bank with orientation selectivity that is a set of an approximate filter with no orientation and a plurality of detail filters with respective orientations; and an image data storage unit that stores image data; the control unit includes: a decomposing unit that performs multiresolution decomposition on the image data by using the wavelet frame with orientation selectivity or the filter bank with orientation selectivity and obtains subband signals; and a reconstructing unit that reconstructs an image by summing the subband signals that are obtained by the decomposing unit and obtains reconstructed image data; and the decomposing unit further includes a coefficient processing unit that performs, between a decomposition phase and a synthesis phase in the multiresolution decomposition, coefficient processing on decomposition detail coefficients that are output from the decomposition phase such that the larger the energy of the decomposition detail coefficients is, the more small values are increased, and the smaller the energy of the decomposition detail coefficients is, the more small values are further reduced.

According to still another aspect of the present invention, in the illusion-considered image generating apparatus described above, the coefficient processing unit performs independent processing according to a difference in the sign of the decomposition detail coefficients.

According to still another aspect of the present invention, in the illusion-considered image generating apparatus described above, a color component of the image data is any one of $L^*$, $a^*$ and $b^*$ of a CIELAB color space.

According to still another aspect of the present invention, in the illusion-considered image generating apparatus described above, the coefficient processing unit performs, for color components of $a^*$ and/or $b^*$ of the image data, the coefficient processing that is corrected such that the larger the energy that is determined from the decomposition detail coefficients of $a^*$ and/or $b^*$ and the decomposition detail coefficients of L* is, the more small values are increased, and the smaller the energy is, the more small values are further reduced.

According to still another aspect of the present invention, in the illusion-considered image generating apparatus described above, the coefficient processing unit performs the coefficient processing using a function that automatically varies continuously in an N-shaped curve when the energy of the decomposition detail coefficients is large, and in an S-shaped curve when the energy of the decomposition detail coefficients is small.

According to still another aspect of the present invention, in the illusion-considered image generating apparatus described above, the coefficient processing unit normalizes, between the decomposition phase and the synthesis phase, the decomposition detail coefficients, uses, as the energy, a norm of normalized decomposition detail coefficients that are obtained by normalizing the decomposition detail coefficients, performs the coefficient processing on the normalized decomposition detail coefficients, and performs inverse operations of the normalization on the normalized decomposition detail coefficients on which the coefficient processing has been performed.

According to still another aspect of the present invention, in the illusion-considered image generating apparatus described above, the decomposing unit performs the multiresolution decomposition using a biorthogonal wavelet filter bank with horizontal, vertical and diagonal orientations or a pinwheel framelet with multiple orientations.

According to still another aspect of the present invention, in the illusion-considered image generating apparatus described above, the decomposing unit uses another filter bank by at least changing the degree of the pinwheel framelet.

According to still another aspect of the present invention, in the illusion-considered image generating apparatus described above, the multiresolution decomposition performed by the decomposing unit is maximal overlap multiresolution decomposition, maximally decimated multiresolution decomposition, or partially decimated and partially overlapping multiresolution decomposition.

According to still another aspect of the present invention, an illusion analyzing method is performed by an illusion analyzing apparatus that includes at least a storage unit and a control unit, the storage unit includes: a filter storage unit that stores a wavelet frame with orientation selectivity or a filter bank with orientation selectivity that is a set of an approximate filter with no orientation and a plurality of detail filters with respective orientations; and an image data storage unit that stores image data; and the illusion analyzing method is performed by the control unit, the illusion analyzing method includes: a decomposing step of performing multiresolution decomposition on a color component of the image data by using the wavelet frame with orientation selectivity or the filter bank with orientation selectivity and obtaining subband signals; a reconstructing step of reconstructing an image by summing the subband signals that are obtained at the decomposing step and obtaining reconstructed image data; and an illusion quantifying step of quantifying an amount of illusion by calculating a ratio or difference in the color component between the image data and the reconstructed image data; and the decomposing step further includes a coefficient processing step of performing, between a decomposition phase and a synthesis phase in the multiresolution decomposition, coefficient processing on decomposition detail coefficients that are output from the decomposition phase such that the larger the energy of the decomposition detail coefficients is, the more small values are further reduced, and the smaller the energy of the decomposition detail coefficients is, the more small values are increased.

According to still another aspect of the present invention, an illusion-considered image generating method is performed by an illusion-considered image generating apparatus includes at least a storage unit and a control unit, the storage unit includes: a filter storage unit that stores a wavelet frame with orientation selectivity or a filter bank with orientation selectivity that is a set of an approximate filter with no orientation and a plurality of detail filters with respective orientations; and an image data storage unit stores image data; and the illusion analyzing method is performed by the control unit, the illusion analyzing method includes: a decomposing step of performing multiresolution decomposition on the image data by using the wavelet frame with orientation selectivity or the filter bank with orientation selectivity and obtaining subband signals; and a reconstructing step of reconstructing an image by summing the subband signals that are obtained at the decomposing step and obtaining reconstructed image data; and the decomposing step further includes a coefficient processing step of performing, between a decomposition phase and a synthesis phase in the multiresolution decomposition, coefficient processing on decomposition detail coefficients that are output from the decomposition phase such that the larger the energy of the decomposition detail coefficients is, the more small values are increased, and the smaller the energy of the decomposition detail coefficients is, the more small values are further reduced.

According to still another aspect of the present invention, a program causes an illusion analyzing apparatus including at least a storage unit and a control unit to execute an illusion analyzing method, the storage unit includes a filter storage unit that stores a wavelet frame with orientation selectivity or a filter bank with orientation selectivity that is a set of an approximate filter with no orientation and a plurality of detail filters with respective orientations, an image data storage unit stores image data, and the program causes the control unit to execute: a decomposing step of performing multiresolution decomposition on a color component of the image data by using the wavelet frame with orientation selectivity or the filter bank with orientation selectivity and obtaining subband signals; a reconstructing step of reconstructing an image by summing the subband signals that are obtained at the decomposing step and obtaining reconstructed image data; and an illusion quantifying step of quantifying an amount of illusion by calculating a ratio or difference in the color component between the image data and the reconstructed image data; and the decomposing step further includes a coefficient processing step of performing, between a decomposition phase and a synthesis phase in the multiresolution decomposition, coefficient processing on decomposition detail coefficients that are output from the decomposition phase such that the larger the energy of the decomposition detail coefficients is, the more small values are further reduced, and the smaller the energy of the decomposition detail coefficients is, the more small values are increased.

According to still another aspect of the present invention, a program causes an illusion-considered image generating apparatus including at least a storage unit and a control unit to execute an illusion-considered image generating method, the storage unit includes a filter storage unit that stores a wavelet frame with orientation selectivity or a filter bank with orientation selectivity that is a set of an approximate filter with no orientation and a plurality of detail filters with respective orientations, an image data storage unit that stores image data, and the program causes the control unit to perform: a decomposing step of performing multiresolution decomposition on the image data by using the wavelet frame with orientation selectivity or the filter bank with orientation selectivity and obtaining subband signals; and a reconstructing step of reconstructing an image by summing the subband signals that are obtained at the decomposing step and obtaining reconstructed image data; and the decomposing step further including a coefficient processing step of performing, between a decomposition phase and a synthesis phase in the multiresolution decomposition, coefficient processing on decomposition detail coefficients that are output from the decomposition phase such that the larger the energy of the decomposition detail coefficients is, the more small values are increased, and the smaller the energy of the decomposition detail coefficients is, the more small values are further reduced.

According to still another aspect of the present invention, a recording medium records the program described above.

Advantageous Effects of Invention

According to the present invention, in a case where a wavelet frame with orientation selectivity or a filter bank with orientation selectivity that is a set of an approximate filter with no orientation and a plurality of detail filters with respective orientations and image data are stored, where multiresolution decomposition is performed on a color component of the image data by using the wavelet frame with orientation selectivity or the filter bank with orientation selectivity and subband signals are obtained, and where an image is reconstructed by summing the subband signals and reconstructed image data is obtained, coefficient processing is performed, between a decomposition phase and a synthesis phase in the multiresolution decomposition, on decomposition detail coefficients that are output from the decomposition phase such that the larger the energy of the decomposition detail coefficients is, the more small values are further reduced, and the smaller the energy of the decomposition detail coefficients is, the more small values are increased, and an amount of illusion is quantified by calculating a ratio or difference in the color component between the image data and the reconstructed image data. Accordingly, the present invention leads to an effect that the amount of illusion that can occur on an arbitrary image can be quantified. More specifically, conventionally, there is no method other than that depending on the sense to know at which part and how much an illusion occurs; however, according to the present invention, it is possible to find at which part and how much an illusion occurs as objective numerical values. More specifically, regarding colors in printing, design, video, painting, etc., it is possible to know where an amount of illusion occurs and know, without depending on techniques of designers, at which position a correction should be made using objective indices.

Furthermore, according to the present invention, independent processing may be performed according to a difference in the sign of the decomposition detail coefficients, which leads to an effect that natural processing more close to the human visual system can be performed.

Furthermore, according to the present invention, any one of L*, a* and b* of a CIELAB color space is used as the color component. Accordingly, the present invention leads to an effect that natural processing more close to the human visual system can be performed.

Furthermore, according to the present invention, the amount of illusion is calculated by using a color difference that is a square-root of sum of squares of differences in the values of L*, a* and b* between the image data and the reconstructed image data, which leads to an effect that an amount of illusion more close to the overall sense can be obtained using a synthesis score obtained by integrating the amounts of illusion by color and lightness.

Furthermore, according to the present invention, for color components of a* and/or b* of the image data, the coefficient processing above is performed that is corrected such that the larger the energy that is determined from the decomposition detail coefficients of a* and/or b* and the decomposition detail coefficients of L* is, the more small values are further reduced, and the smaller the energy is, the more small values are increased. This leads to an effect that image processing natural to the human visual perception where the effects of lightness and the effects of color cooperate can be performed.

Furthermore, according to the present invention, the coefficient processing is performed using a function that automatically varies continuously in an S-shaped curve when the energy is large, and in an N-shaped curve when the energy is small. Accordingly, the present invention leads to an effect that the coefficient processing where the larger the energy of the decomposition detail coefficients is, the more small values are reduced, and the smaller the energy of the decomposition detail coefficients is, the more small values are increased can be preferably performed using the function that varies continuously from an S-shaped curve to an N-shaped curve. More specifically, because, by using a function that increases variations in the decomposition detail coefficients when the surrounding stimulus is strong, and reduces variations in the decomposition detail coefficients when the surrounding stimulus is weak, weak stimulus is weakened when the surrounding stimulus is strong and an attention is paid for even a small stimulus when the surrounding stimulus is weak, so that appropriate processing can be performed per image automatically.

Furthermore, according to the present invention, the decomposition detail coefficients are normalized between the decomposition phase and the synthesis phase, a norm of normalized decomposition detail coefficients that are obtained by normalizing the decomposition detail coefficients is used as the energy, the coefficient processing is performed on the normalized decomposition detail coefficients, and inverse operations of the normalization are performed on the normalized decomposition detail coefficients on which the coefficient processing has been performed. Accordingly, the present invention leads to an effect that the normalization makes the coefficients easy to handle in function processing, energy calculation, etc.

Furthermore, according to the present invention, the multiresolution decomposition is performed using a biorthogonal wavelet filter bank with horizontal, vertical and diagonal orientations or a pinwheel framelet with multiple orientations. Accordingly, the present invention leads to an effect that it is possible to perform simple calculations using the biorthogonal wavelet filter bank and perform minute calculations using the pinwheel framelet.

Furthermore, according to the present invention, another filter bank may be used by, for example, changing the degree of the pinwheel framelet according to the level. This leads to an effect that image processing into which the characteristics of the human visual system are taken into consideration can be performed.

Furthermore, according to the present invention, the multiresolution decomposition is maximal overlap multiresolution decomposition, maximally decimated multiresolution decomposition, or partially decimated and partially overlapping multiresolution decomposition, which leads to an effect that, because decomposition detail coefficients can be obtained by performing preferable multiresolution decomposition and low-frequency components in addition to high-frequency components can be processed by multi-resolution, natural image processing can be performed.

Furthermore, according to the present invention, in a case where image data is edited and control is performed such that the multiresolution decomposition is performed on the edited image data, a ratio or difference between the reconstructed image data obtained from the edited image data and the image data that is unedited is calculated as the amount of illusion and editing is repeatedly performed such that the amount of illusion is reduced. This makes it possible to resultantly obtain an edited image (image for output) that is perceived according to the image (initial image) before being edited in consideration for the amount of illusion in the brain. Such an image for output is output, for example, printed out, printed, displayed or painted, and a person who looks at the image perceives the image according to the original initial image before being edited, which leads to an effect that an adjustment on the color scheme depending on the expert techniques, which is conventionally performed, is unnecessary.

Furthermore, in the present invention, in a case where the image data is edited and control is performed such that the multiresolution decomposition is performed on the edited image data, a ratio or difference between the edited image data and the reconstructed image data obtained from the edited image data is calculated as the amount of illusion and editing is repeatedly performed such that the amount of illusion is at a given numerical value. This leads to an effect that an image with an arbitrary amount of illusion, such as an image with a large amount of illusion or an image with a small amount of illusion, can be created.

Furthermore, in the present invention, in a case where a wavelet frame with orientation selectivity or a filter bank with orientation selectivity that is a set of an approximate filter with no orientation and a plurality of detail filters with respective orientations and image data are stored, where multiresolution decomposition is performed on a color component of the image data by using the wavelet frame with orientation selectivity or the filter bank with orientation selectivity and subband signals are obtained, and where an image is reconstructed by summing the subband signals and reconstructed image data is obtained, coefficient processing is performed, between a decomposition phase and a synthesis phase in the multiresolution decomposition, on decomposition detail coefficients that are output from the decomposition phase such that the larger the energy of the decomposition detail coefficients is, the more small values are increased, and the smaller the energy of the decomposition detail coefficients is, the more small values are further reduced, thereby generating an image for which an illusion is taken into consideration. Accordingly, the present invention allows, for an arbitrary image, to obtain an image for output that is perceived according to the image in consideration for the amount of illusion in the brain. Such an image for output is output, for example, printed out, printed, displayed, or painted, and a person which looks at the image perceives the image according to the original initial image before being edited, which leads to an effect that adjustment on the color scheme depending on the expert techniques, which is conventionally performed, is unnecessary.

BRIEF DESCRIPTION OF DRAWINGS

FIG. 5 is a diagram in which an approximate part is denoted by $a_k$ and detail parts are denoted by symbols (numbers) $d_k(1)$ to $d_k(99)$ in a pinwheel framelet at level k of degree 7.

FIG. 15 is a diagram where the differences in the value of L*, the value of a*, and the value of b* at the set of center coordinates of the inner square part between the original image and the processed image and the synthesis scores thereof are plotted as the amount of illusion.

FIG. 16 is a diagram showing the original images of Numbers 1 to 3, the graphs of L*, a* and b* at the center cross sections of the original images, the processed images corresponding to the original images, and the graphs of L*, a* and b* at the center cross sections of the processed images.

FIG. 19 is a diagram that contrasts an original image where the lightness of the inner small square and the lightness of the outer large square are uniform and an original image where the lightness of the inner small square and the lightness of the outer large square are greatly different from each other.

DESCRIPTION OF EMBODIMENTS

An embodiment of an illusion analyzing apparatus, an illusion-considered image generating apparatus, an illusion analyzing method, an illusion-considered image generating method, and a program according to the invention will be described in detail below according to the drawings. The embodiment does not limit the invention. For example, for the color space of the present embodiment, an example using the CIE (International Commission on Illumination) uniform perceptual color space (L*, a* and b* expression system) will be described; however, alternatively, color components of another color space may be used as long as it is close to the human visual system.

[Configuration of Illusion Analyzing Apparatus 100]

Figure 1:
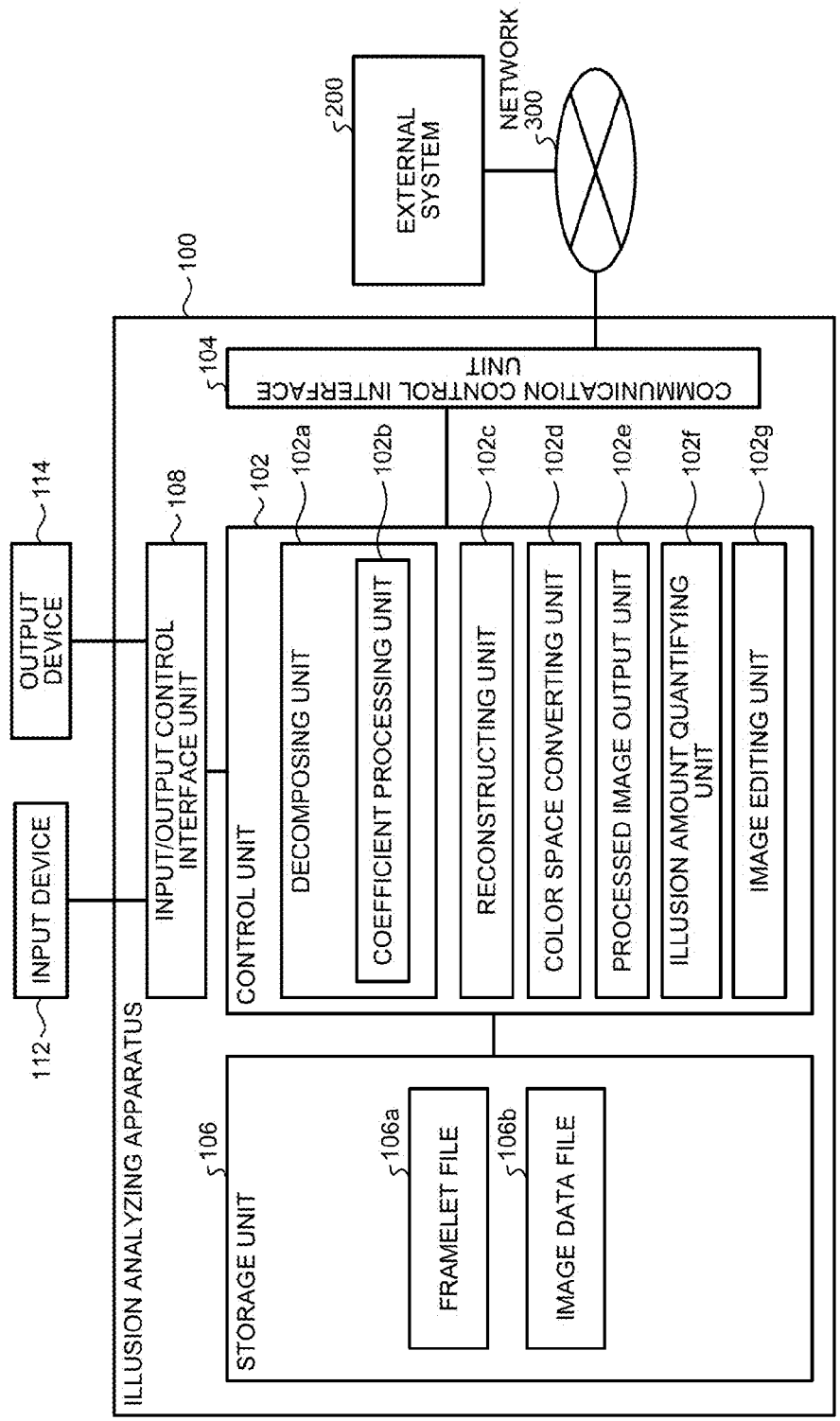
FIG. 1 is a block diagram showing an example of the configuration of an illusion analyzing apparatus 100 to which the present embodiment is applied.

An illusion analyzing apparatus 100 according to the present embodiment serving as an illusion analyzing apparatus and an illusion-considered image generating apparatus will be described here with reference to FIG. 1. FIG. 1 is a block diagram showing an example of the configuration of the illusion analyzing apparatus 100 to which the present embodiment is applied, where only components relevant to the present embodiment from the configuration are shown conceptually.

Schematically, the illusion analyzing apparatus 100 in FIG. 1 includes a control unit 102, a communication control interface unit 104, an input/output control interface unit 108, and a storage unit 106. The control unit 102 is, for example, a CPU that controls the illusion analyzing apparatus 100 across-the-board. The input/output control interface unit 108 is an interface that is connected to an input device 112 and an output device 114. The storage unit 106 is a device that stores various data bases and tales. These units of the illusion analyzing apparatus 100 are communicatively connected one another via arbitrary communication paths.

Various files (a framelet file 106a and an image data file 106b) stored in the storage unit 106 are a storage unit, such as a fixed disk device. For example, the storage unit 106 stores various programs used for various types of processing, tables, files, databases, webpages, etc.

Figure 2:
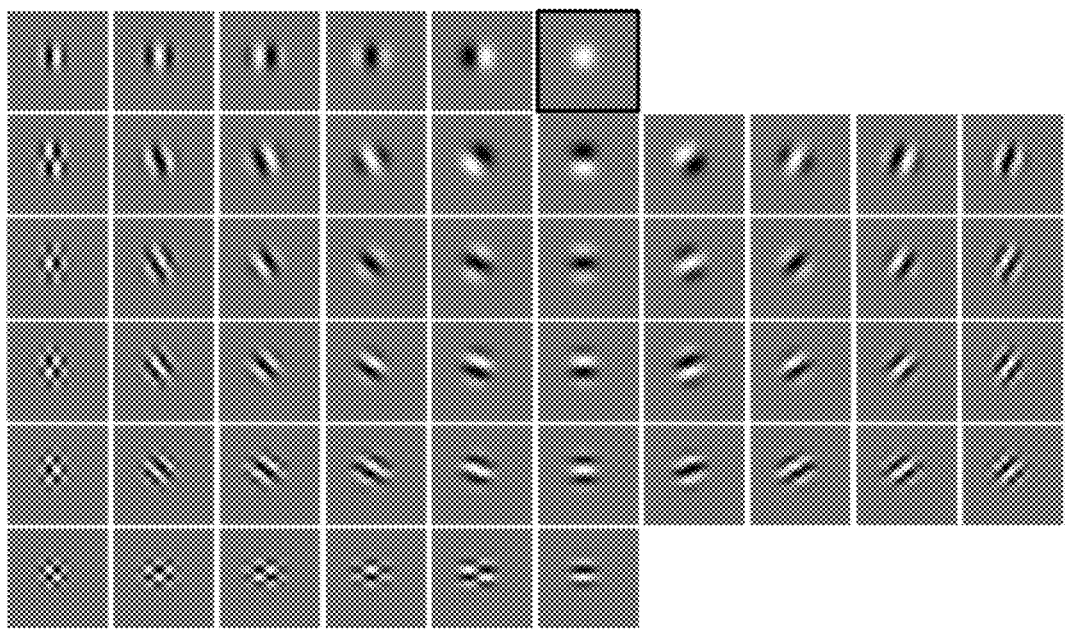
FIG. 2 is a diagram showing filters that are obtained by calculating the cyclic correlation product of maximal overlap pinwheel framelet filters at level 3 of degree 5 and maximal overlap pinwheel framelet approximate filters at levels 1 and 2 of degree 5.

From among these components of the storage unit 106, the framelet file 106a is a filter storage unit that stores a wavelet frame with orientation selectivity or a filter bank with orientation selectivity that is a set of an approximate filter with no orientation and a plurality of detail filters with respective orientations. In the present embodiment, a pinwheel framelet is used as a wavelet frame with orientation selectivity; however, the wavelet frame with orientation selectivity is not limited to this. For example, a simple pinwheel framelet (see Non Patent Literature 3) and a pinwheel wavelet frame (see Non Patent Literature 4) etc. may be used. Furthermore, in addition to pinwheel framelets with multiple orientations, biorthogonal wavelet filter banks with horizontal, vertical or diagonal orientations may be used. In a pinwheel wavelet frame, the length of the filters constituting the frame changes in accordance with the number of pixels of the original image, whereas a pinwheel framelet and a simple pinwheel framelet have a property where the length of the filters is independent of the number of pixels. For example, a pinwheel framelet is a two-dimensional framelet with orientation selectivity, and is one type of wavelet frame. A pinwheel framelet is, for example, a mathematical model of simple cells in the human visual cortex. This decomposition is a mathematical model of signals decomposed by simple cells in the human brain. A pinwheel framelet is a model neuroscientifically closer to simple cells in V1 of the cerebral cortex than a simple pinwheel framelet is. A pinwheel framelet, for example, has a degree that is an odd number of three or greater. The larger the degree is, the more the orientations can be detected. A pinwheel framelet has a property where the number of filters increases and the calculation time increases as the degree increases. The number of filters of a pinwheel framelet of degree n is, for example, $(n+1)^2+(n-1)^2$. From among these filters, one filter is an approximate filter and the remaining filters are detail filters. FIG. 2 is a diagram showing filters obtained by calculating the cyclic correlation product of maximal overlap pinwheel framelet filters at level 3 of degree 5 and maximal overlap pinwheel framelet approximate filters at levels 1 and 2 of degree 5 (for the cyclic correlation product, see, for example, Hitoshi Arai. *Senkei Daisuu Kiso to Ouyou* (Linear Algebra, Basics and Applications), Nippon Hyoron Sha Co., Ltd. (2006)).

Because the degree of this pinwheel framelet is 5, for example, as illustrated FIG. 2, the pinwheel framelet is composed of a set of 52 filters in total that is a combination of 6×6 filters on the left side and 4×4 filters on the right side, for each level. From among the filters, the one filter in the central upper part in FIG. 2 is a filter obtained by calculating the cyclic correlation product of the approximate filters from level 1 to level 3, and those other 51 filters are filters obtained by calculating the cyclic correlation product of the detail filters at level 3 and the approximate filters from level 1 to level 2. The orientations of the filters generated from the detail filters are arranged substantially in the direction in which a pinwheel rotates around the filter generated only from the approximate filter. As described below, the maximal overlap multiresolution decomposition by using a pinwheel framelet of each degree has levels, and level 1 detects the finest portion (high-frequency portion). FIG. 2 illustrates the pinwheel framelet at level 3, and more approximate portions (low-frequency portions) are detected as the level increases to 2, 3, . . . . The framelet file 106*a* may store wavelet frames with orientation selectivity, such as a pinwheel framelet, in the form of a function (such as a frequency response function of framelet filters). A detailed example of the function will be described below.

Various wavelets may be used in the present embodiment without being limited to the above. Here, the wavelet is not limited to a classical wavelet, a wavelet in a narrow sense, or the like, and includes a wavelet in a broad sense. For example, the wavelet is a finite-length waveform or a wave-like oscillation with an amplitude that is amplified from zero and quickly converges to zero, and, for example, includes pseudo wavelets, such as a Gabor filter and a curvelet. Moreover, the framelet file 106*a* may store therein a filter group, such as a filter bank with orientation selectivity and filters with orientations, without being limited to such frames as wavelet frames with orientation selectivity. The filters with respective orientations are, for example, a plurality of detail filters with respective orientations and, for example, the components, such as sub-band signals, are extracted by the filters.

The image data file 106*b* is an image data storage unit that stores image data. Here, the image data stored in the image data file 106*b* may be image data where the tone, gradation value, etc. are written per color component or image data written by the color components that are dealt with in the present embodiment. In the latter case, a color space converting unit 102*d*, which will be described below, converts the image data into a desired color space and decomposes the data into color components. The image data that is stored in the image data file 106*b* may be image data that is input via the input device 112 or image data that is received from an external system 200 via a network 300. The image data may be image data of color image or grayscale image data. The previous image (data) before being subjected to multiresolution decomposition using a wavelet frame with orientation selectivity, such as a pinwheel framelet, is referred to as the original image (data) and the post image (data) after being reconstructed according to subband signals is referred to as the reconstructed image (data). The image data file 106*b* may store, as image data, unit impulse signals for an image size (the number of pixels) equal to that of the image data of the target original image. The unit impulse signals stored in the image data file 106*b* are input to the filter bank stored in the framelet file 106*a* similarly as image data, and the unit impulse response that is output is used for high-speed calculation of the image data of the target original image. The image data may be, for example, two-dimensional image data in raster format or vector format. The image may be an arbitrary image representing, for example, a design, a photograph, or letters, etc. Alternatively, the image may be not only a still image but also may be a moving image (video).

The following description refers back to FIG. 1. The input/output control interface unit 108 controls the input device 112 and the output device 114. For example, a display device, such as a monitor (including a home television), and a printing device, such as a printer, can be used as the output device 114. As the input device 112, for example, a keyboard, a mouse, and a microphone, etc. can be used in addition to an imaging device, such as a camera, and an input device connected to an external storage medium, etc.

In FIG. 1, the control unit 102 includes an internal memory for storing control programs for an OS (Operating system), etc. a program defining, for example, various processing procedures, and necessary data. The control unit 102 performs information processing for performing various types of processing, for example, using these programs. The control unit 102 includes a decomposing unit 102*a*, a reconstructing unit 102*c*, the color space converting unit 102*d*, a processed image output unit 102*e*, an illusion amount quantifying unit 102*f*, and an image editing unit 102*g*. The decomposing unit 102*a* further includes a coefficient processing unit 102*b*.

Figure 3:
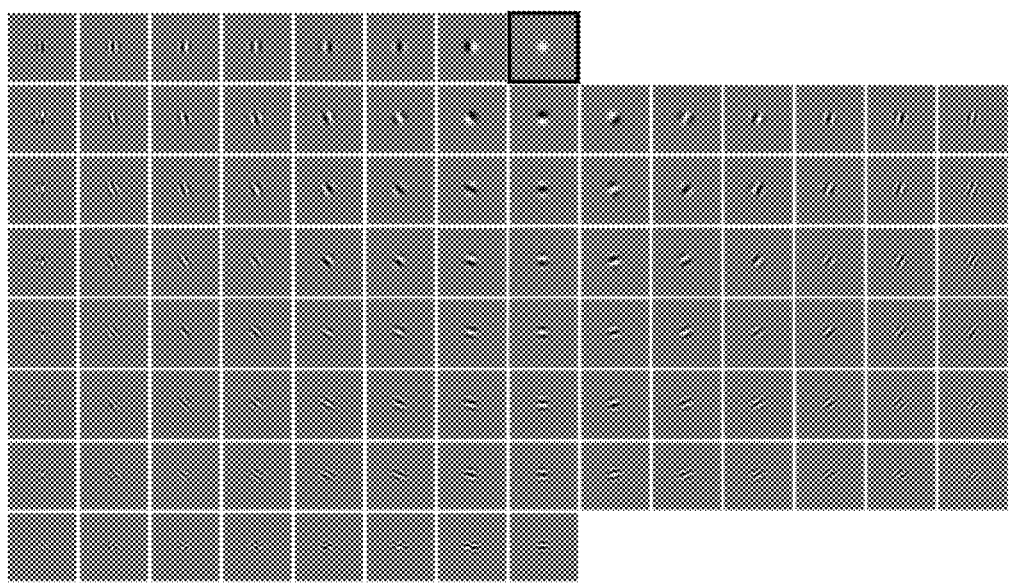
FIG. 3 is a diagram showing filters obtained by calculating the cyclic correlation product of maximal overlap pinwheel framelet filters at level 2 of degree 7 (high-frequency side) and maximal overlap pinwheel framelet approximate filters at level 1.
Figure 4:
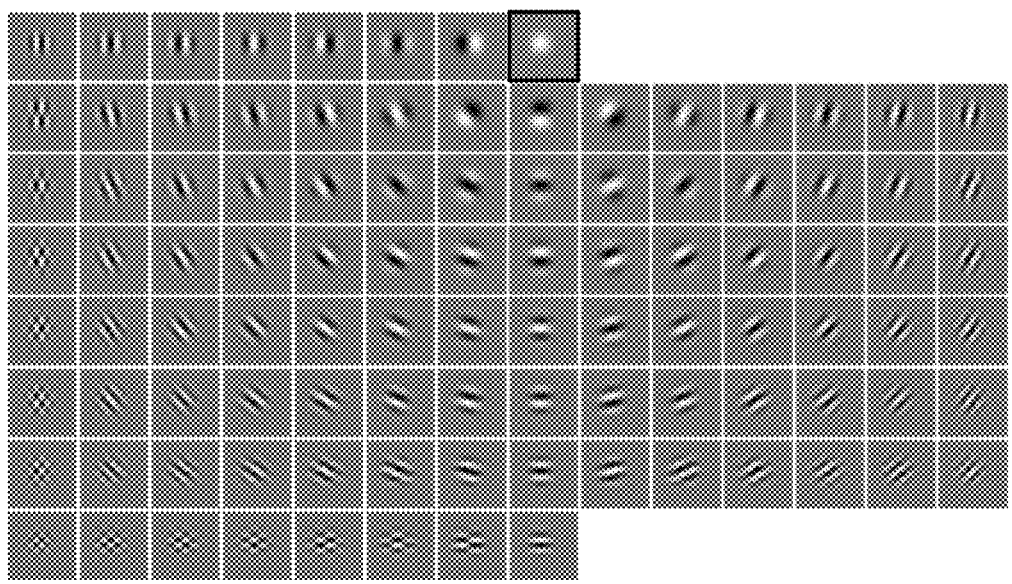
FIG. 4 is a diagram showing filters obtained by calculating the cyclic correlation product of maximal overlap pinwheel framelet filters at level 3 of degree 7 (low-frequency side) and maximal overlap pinwheel framelet approximate filters at levels 1 and 2.

The decomposing unit 102*a* is a decomposing unit that obtains subband signals by performing multiresolution decomposition on image data (e.g., color components of image data) by using a wavelet frame with orientation selectivity, such as a pinwheel framelet, stored in the framelet file 106*a*. The "multiresolution decomposition" includes maximal overlap multiresolution decomposition, maximally decimated multiresolution decomposition, and partially decimated and partially overlapping multiresolution decomposition (for the maximal overlap multiresolution decomposition, see, for example, Hitoshi Arai, "Wavelet", Kyoritsu Shuppan Co., Ltd. (2010)). When the multiresolution decomposition is calculated by the decomposing unit 102*a*, the cyclic correlation product and a cyclic convolution product are used and they may be calculated by a well-known high-speed calculation method that uses fast Fourier transformation. As described above, the multiresolution decomposition using a wavelet frame with orientation selectivity, such as a pinwheel framelet, has levels. FIGS. 3 and 4 are diagrams for showing the difference depending on the level of the pinwheel framelet. FIG. 3 illustrates filters obtained by calculating the cyclic correlation product of maximal overlap pinwheel framelet filters at level 2 (high-frequency side) and a maximal overlap pinwheel framelet approximate filter at level 1. FIG. 4 illustrates filters obtained by calculating the cyclic correlation product of maximal overlap framelet filters at level 3 (low-frequency side) and maximal overlap pinwheel framelet approximate filters at levels 1 and 2. Because the degree of both of them is 7, the number of filters is $(7+1)^2+(7-1)^2=100$.

For example, the decomposing unit 102*a* first detects the finest portion (high-frequency portion) by maximal overlap multiresolution decomposition using a pinwheel framelet at level 1 and detects more approximate portions (lower-frequency portions) as the level increases to 2, 3, ....

The multiresolution decomposition using a pinwheel framelet includes a decomposition phase and a synthesis phase. Each of the phases is composed of a filter bank composed of an array of an approximate filter and detail filters. After performing image processing in the decomposition phase and the synthesis phase, the decomposing unit 102a finally decomposes the original image data into image signals (i.e., subband signals), the number of which is "the number of filters× levels".

For example, in the case of maximal overlap multiresolution decomposition at level 5 using a pinwheel framelet of degree 7, the subband signals at a certain level k (k=1 to 5) include one approximate part obtained by one approximate filter and 99 detail parts obtained by 99 detail filters. FIG. 5 is a diagram in which the approximate part is denoted with $a_k$, and the detail parts are denoted with symbols (numbers) of $d_k(1)$ to $d_k(99)$ in the pinwheel framelet at level k of degree 7. The position of the symbol (number) is associated with the position of each filter in FIG. 3 (k=2) or FIG. 4 (k=3). In other words, $a_k$ and $d_k(1)$ to $d_k(99)$ represent the subband signals obtained by the filters in the corresponding positions in FIG. 3 or FIG. 4.

The coefficient processing unit 102b of the decomposing unit 102a is a coefficient processing unit that performs, between the decomposition phase and the synthesis phase, coefficient processing on the decomposition detail coefficients that are output from the decomposition phase. For example, the coefficient processing unit 102b may perform coefficient processing such that the larger the energy of decomposition detail coefficients is, the more small values are further reduced, and the smaller the energy of the decomposition detail coefficients is, the more small values are increased (which can be referred to as "forward processing" below). For example, if the energy of the decomposition detail coefficients is large, the coefficient processing unit 102b increases variations in the decomposition detail coefficients to further increase relatively large values while further reducing relatively small values. On the other hand, if the energy of the decomposition detail coefficients is small, the coefficient processing unit 102b reduces variations in the decomposition detail coefficients to further reduce relatively large values while increasing relatively small values.

The coefficient processing unit 102b may perform, in addition to the above-described forward processing, coefficient processing such that the larger the energy of the decomposition detail coefficients is, the more small values are increased, and the smaller the energy of the decomposition detail coefficients is, the more small values are further reduced (which can be referred to as "reverse processing"). For example, if the energy of the decomposition detail coefficients is large, the coefficient processing unit 102b reduces variations in the decomposition detail coefficients to reduce relatively large values while increasing relatively small values. On the other hand, if the energy of the decomposition detail coefficients is small, the coefficient processing unit 102b increases variations in the decomposition detail coefficients to further increase relatively large values while further reducing relatively small values.

Here, in a case of an image having a large number of pixels, the image may be divided properly and the processing of the present embodiment may be performed on each of the divisions of the image.

The coefficient processing unit 102b may perform a normalization to make the values of the decomposition detail coefficients easy to handle in the coefficient processing, such as function processing, and/or energy calculations. For example, at first, the coefficient processing unit 102b may normalize, between the decomposition phase and the synthesis phase, decomposition detail coefficients using an absolute value and use, as the energy, the squared norm (or another norm) of the decomposition detail coefficients that are normalized (referred to as "normalized decomposition detail coefficients"). The coefficient processing unit 102b may perform coefficient processing on the normalized decomposition detail coefficients according to the calculated energy and perform an inverse operation of the normalization on the normalized decomposition detail coefficients on which the coefficient processing has been performed, thereby obtaining input data to the synthesis phase. If an absolute value is used, the sign is restored upon the inverse operation as represented by the following equation:

$$x' = \text{sgn}(x) z'$$

(where x denotes decomposition detail coefficients, z denotes a value after the coefficient processing and z' denotes a value resulting from the inverse operation of the normalization. If x≥0, sgn(x)=1. If x<0, sgn(x)=−1. Note that x' denotes a value resulting from restoring of the sign.).

In order to perform coefficient processing according to the magnitude of energy, the coefficient processing unit 102b may set a threshold for energy value and perform different types of coefficient processing for the respective energy value ranges, or may perform, without setting any threshold for energy value, coefficient processing by performing operations using a function with which the variations change continuously according to the energy value. In the former case, for example, the coefficient processing unit 102b may use a function (e.g. a logit function, a logistic equation, etc.) that is set per energy value range. In the latter case, for example, the coefficient processing unit 102b may perform, as the forward processing, coefficient processing using a function that varies continuously in an S-shaped curve when the energy of the decomposition detail coefficients is large, and in an N-shaped curve when the energy is small (which is referred to as the "SN function"). An example of the SN function will be presented below (see Non Patent Literature 2). According to Equation 1, an S-shaped curve is represented if α>1, a straight line is represented if α=1, and an N-shaped curve is represented if α<1.

$$z = y^\alpha / \{y^\alpha + (1-y)^\alpha\} \quad \text{(Equation 1)}$$

(where y denotes normalized decomposition detail coefficients (0≤y≤1), α denotes an index value (0≤α) based on the energy of the normalized decomposition detail coefficients, and z denotes normalized decomposition detail coefficients on which function processing has been performed.) Note that functions may be made discrete to be made into a table.

In the above Equation 1, if an index value that is re-determined such that relative relationship between a at the determination of α and the energy is inversed, e.g. an inverse of α, is replaced with a again, the SN function of the inverse processing is led. In other words, with replacement with α as described above, the coefficient processing unit 102b can perform, as the reverse processing, reverse coefficient processing using the SN function that varies continuously in an N-shaped curve when the energy of the decomposition detail coefficients is large, and in an S-shaped curve when the energy of the decomposition detail coefficients is small. In the following embodiment, explanations for performing the forward processing will be given, which can be read as explanations for performing the reverse processing similarly by interchanging the contents of coefficient processing according to the magnitude of energy.

For example, the coefficient processing unit 102b performs coefficient processing per color component, for example, for L*, a* and b* of a CIELAB color space. The coefficient processing is not limited to independent processing on the value of each color component and, when coefficient processing is performed on one color component, coefficient processing may be corrected according to the values of other color components. For example, there is a neuroscience experimental result representing that the human visual system has color and lightness cells in the cerebral cortex (see Non Patent Literature 5). A mathematical model assuming the rolls of the color and lightness cells may be devised according to the experimental result and, for the color components of a* and/or b* of the image data, the coefficient processing unit 102b may perform coefficient processing that is corrected such that the larger the energy determined from the decomposition detail coefficients of a* and/or b* and the decomposition detail coefficients of L* is, the more small values are further reduced, and the smaller the energy is, the more small values are increased. Separate processing may be performed according to the difference in the signs of the decomposition detail coefficients.

The reconstructing unit 102c is a reconstructing unit that reconstructs an image by summing the subband signals acquired by the decomposing unit 102a, thereby obtaining reconstructed image data. For example, the reconstructing unit 102c obtains reconstructed image data by reconstructing an image by summing the subband signals of the approximate part obtained by the approximate filter at the maximum level, which is described above, and the subband signals of the detail parts obtained by all the detail filters. At this point, because the pinwheel framelet has a perfect reconstruction property, if the coefficient processing unit 102b does not perform any processing, the reconstructing unit 102c reproduces the same image as the original image. In other words, after the decomposition detail coefficients are increased or reduced by the processing performed by the coefficient processing unit 102b, the reconstructing unit 102c sums the subband signals to acquire the reconstructed image data obtained by performing natural image processing on the original image.

The perfect reconstruction property will be described using the symbols (numbers) described above. If x denotes the input signal (original signal) of the original image, the perfect reconstruction property of maximal overlap multiresolution decomposition at level 5 using a pinwheel framelet of degree 7 is expressed by the following equation.

$$x = a_5 + (d_5(1) + \ldots + d_5(99)) + \ldots + (d_1(1) + \ldots + d_1(99))$$

In this case, if the detail parts having been processed by the coefficient processing unit 102b in the decomposing unit 102a is $d_5'(1), \ldots, d_1'(99)$, the reconstructed image (signal) is expressed by the following equation.

$$y = a_5 + (d_5'(1) + \ldots + d_5'(99)) + \ldots + (d_1'(1) + \ldots + d_1'(99))$$

If the decomposing unit 102a does not perform the coefficient processing, it yields $d_5'(1) = d_5(1), \ldots, d_1'(99) = d_1(99)$. Thus, it is clear that x=y (the original image and the reconstructed image are the same), which indicates a perfect reconstruction.

The color space converting unit 102d is a color space converting unit that performs conversion of the color space, decomposition and synthesis of the color components, etc. For example, if the image data stored in the image data file 106b is a color image and the data is not written by the color components used in the present embodiment, the color space converting unit 102d converts the image data into an intended color space (e.g. a CIELAB color space) before the processing performed by the decomposing unit 102a. The conversion into the CIELAB color space leads to decomposition of the image the image into three color components: L* (lightness), a* (red-green), and b* (yellow-blue). The color space converting unit 102d may convert the image data into a color space other than the CIELAB color space. An advantage of using the CIELAB color space is that the conversion is close to the visual information conversion from the human retinas. If the tone, gradation value, etc., are written in advance in the image data per color component used in the present embodiment, the color space converting unit 102d does not need to perform processing relevant to the color space. If necessary, the color space converting unit 102d performs synthesis of the color components, color space conversion, and lightness and color scale conversion, etc.

The processed image output unit 102e outputs the reconstructed image data that is reconstructed by the reconstructing unit 102c to the output device 114. For example, the processed image output unit 102e may output the reconstructed image for display to a display device, such as a monitor, or may output the reconstructed image for printing to a printing device, such as a printer, to produce a printing medium. The medium on which the reconstructed image is to be printed may be, for example, paper, a transparency, or the like, or may be in the form of, for example, a flyer, a fan, a card, a picture book, a New Year's card, a Christmas card, or a business card. The processed image output unit 102e may change the design (for example, the size is changed to postcard size or the like) depending on its intended use according to the output form. Moreover, the processed image output unit 102e may transmit reconstructed image data to the external system 200 via the network 300.

The illusion amount quantifying unit 102f is an illusion amount quantifying unit that quantifies the amount of illusion by calculating the ratio or difference in the color components between image data and reconstructed image data. For example, the illusion amount quantifying unit 102f may calculate, as the amount of illusion, the difference (including an absolute value or the square of the difference) or ratio (including rate, proportion, percentage, etc.) in the value of L*, a* or b* at the same set of pixel coordinates between the image data and the reconstructed image data. The illusion amount quantifying unit 102f may integrate the differences in the values of L* and a* and b* and calculate a square-root of sum of squares of the differences as an overall amount of illusion. The illusion amount quantifying unit 102f may output the numerical value of the quantified amount of illusion to the output device 114 or may plot the amount of illusion on a graph and outputs the graph to the output device 114. For example, the illusion amount quantifying unit 102f may plot, on a graph, the amount of illusion at a set of coordinates on the cross-sectional line across the image and output the graph to the output device 114. The illusion amount quantifying unit 102f may further implement a three-dimensional display for a two-dimensional image using the amount of illusion serving as the height.

The image editing unit 102g is an image editing unit that edits image data. For example, the image editing unit 102g may, for example, change the tone or gradation value of the image data that is stored in the image data file 106b. The image editing unit 102g may cause the user to edit the image via the input device 112 or may edit the image automatically using an arbitrary algorithm for, for example, white balance.

In exemplary manual editing, the image editing unit 102g may cause the output device 114 to display the histogram where the number of pixels per lightness of the image to be edited is plotted and cause the user to adjust the lightness and contrast of the image on the histogram. In exemplary automatic editing, the image editing unit 102g may selectively change the color of the set of pixels belonging to an area in a single color where the amount of illusion calculated by the illusion amount quantifying unit 102f is at a given value or larger or an area in a single color adjacent to that area. The image editing unit 102g may increase the amount by which the color is to be changed if the amount of illusion of the color component calculated by the illusion amount quantifying unit 102f is large and may reduce the amount by which the color is to be changed if the amount of illusion is small. As described above, by repeatedly editing the image to reduce (for example, minimize) the difference (amount of illusion) between the illusion image according to the changed image and the original initial image, the image editing unit 102g may obtain an image (image for output) for which the amount of illusion in the brain is taken into consideration and that is, as a result, perceived according to the initial image. In other words, such an image for output is output, for example, printed out, printed, displayed or painted, and then a person who looks at the output image perceives the image in the brain according to the original initial image before being edited, which leads to an effect that an adjustment on the color scheme depending on the expert techniques, which is conventionally performed, is unnecessary. It is not limited to using the numerical value obtained by calculating, as the amount of illusion, the ratio or difference between the reconstructed image data obtained from the edited image data and the unedited image data, and the numerical value obtained by calculating, as the amount of illusion, the ratio or difference between the edited image data and the reconstructed image data obtained from the edited image data may be used. In this case, by repeatedly performing editing such that the amount of illusion is at a given numerical value, the image editing unit 102g performs editing to achieve a desired amount of illusion using the quantified amount of illusion as an index, which leads to an effect that an image with an arbitrary amount of illusion, such as an image with a large amount of illusion or an image with a small amount of illusion, can be created.

The illusion analyzing apparatus 100 may be communicatively connected to the network 300 via a communication device, such as a router, and a wired or wireless communication line, such as a dedicated line. In FIG. 1, the communication control interface unit 104 performs communication control between the illusion analyzing apparatus 100 and the network 300 (or a communication device, such as a router). In other words, the communication control interface unit 104 is an interface connected to a communication device (not shown), such as a router, connected to a communication line or the like, and has the function of performing data communication with other terminals via communication lines. In FIG. 1, the network 300 has the function of mutually connecting the illusion analyzing apparatus 100 and the external system 200 and is, for example, the Internet or the like.

In FIG. 1, the external system 200 is mutually connected to the illusion analyzing apparatus 100 via the network 300 and may have the function of providing a program for causing an external database relating to image data or a pinwheel framelet or a computer to function as the illusion analyzing apparatus 100. The external system 200 may be configured as a WEB server, an ASP server, or the like. Moreover, the hardware configuration of the external system 200 may be composed of an information processing apparatus, such as a commercially available workstation and personal computer, and accessory devices thereof. The functions of the external system 200 are implemented by a CPU, a disk device, a memory device, an input device, an output device, a communication control device, and the like in the hardware configuration of the external system 200, computer programs for controlling these devices, and the like.

Here is the end of the descriptions of the configuration of the illusion analyzing apparatus 100 according to the present embodiment.

[Processing by Illusion Analyzing Apparatus 100]

An example of the processing performed by the illusion analyzing apparatus 100 according to the present embodiment configured as described above will be described below with reference to FIGS. 6 to 39.

[Basic Processing]

Figure 6:
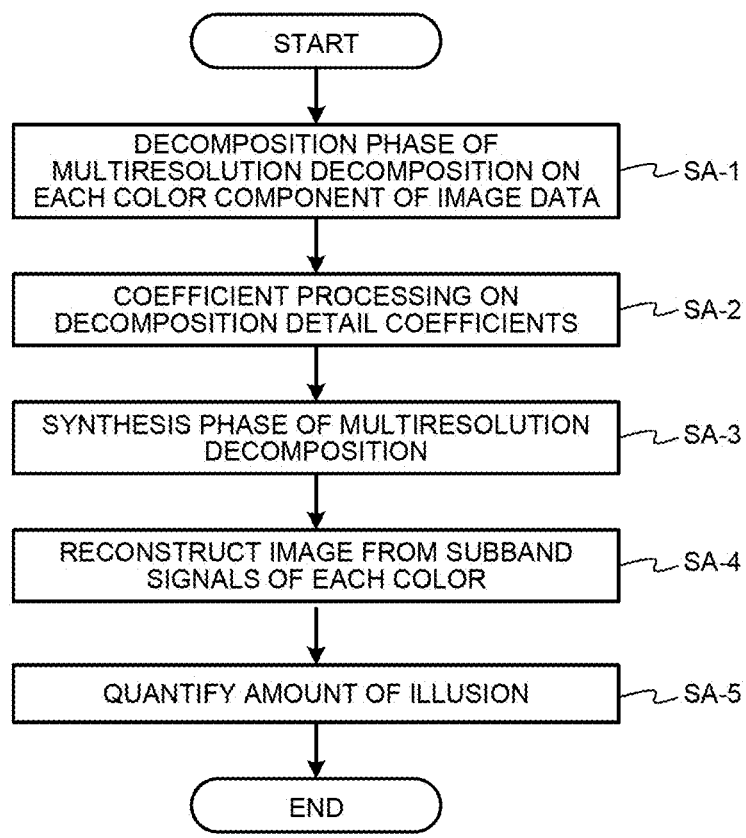
FIG. 6 is a flowchart showing an example of the basic processing performed by the illusion analyzing apparatus 100 according to the present embodiment.

First, the basic processing performed by the illusion analyzing apparatus 100 will be described with reference to FIGS. 6 to 8. FIG. 6 is a flowchart showing an example of the basic processing performed by the illusion analyzing apparatus 100 according to the present embodiment.

First, the decomposing unit 102a obtains subband signals by performing maximal overlap multiresolution decomposition by using the pinwheel framelets stored in the framelet file 106a on the color components of the image data stored in the image data file 106b (Step SA-1). The decomposing unit 102a may use a biorthogonal wavelet filter bank with horizontal, vertical or diagonal orientations. If necessary (for example, in a case where the image data is not written by the color components used in the present embodiment, or the like), the color space converting unit 102d may perform, on a color image, processing for converting the image into a desired color space and color component decomposing processing. For example, the color space converting unit 102d may convert the color image into a CIELAB color space. Accordingly, the image is decomposed into three color components: L* (lightness), a* (red-green), and b* (yellow-blue). FIG. 7 is a diagram showing an example of the filter banks in the decomposition phase and the synthesis phase of maximal overlap multiresolution decomposition. The numbers in FIG. 7 indicate the levels. "PW" denotes detail filters. In the case of degree 7, there are 99 detail filters for each level. "A" denotes approximate filters. In the case of degree 7, there is one approximate filter for each level. In the example of FIG. 7, maximal overlap method is used; however, the embodiment is not limited to this, and another decimating method may be used for maximally decimating method.

Figure 7:
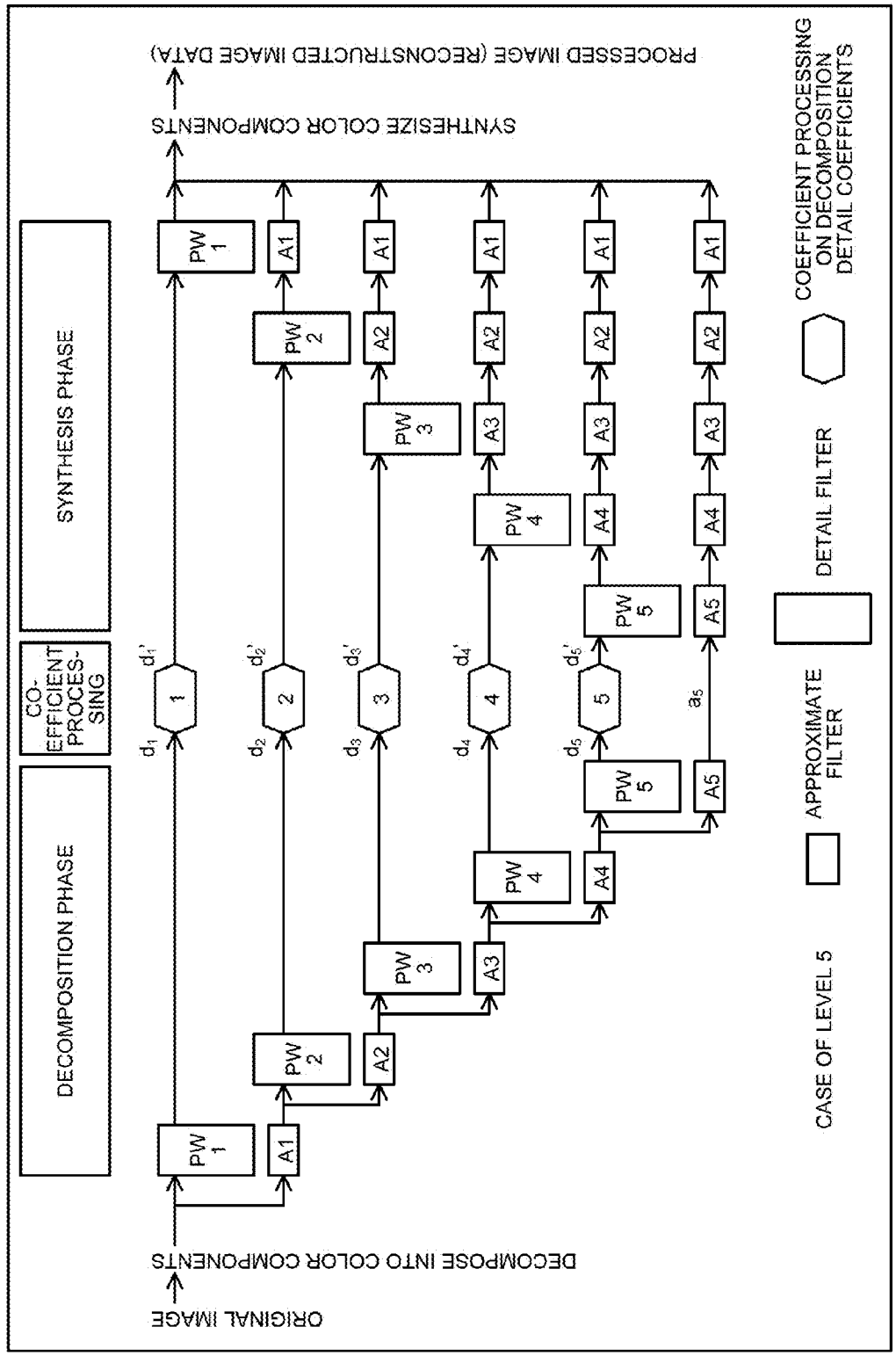
FIG. 7 is a diagram showing an example of filter banks in the decomposition phase and the synthesis phase of maximal overlap multiresolution decomposition.

First, as illustrated in FIG. 7, using a pinwheel framelet at level 1, the decomposing unit 102a uses the original image as input signals and decomposes the input signal into signals that pass through 99 detail filters and a signal that passes through one approximate filter (signals whose signal intensity is expressed by the decomposition detail coefficients $d_1$). Next, using a pinwheel framelet at level 2, the decomposing unit 102a decomposes the signal that has passed through the approximate filter at level 1 into signals that pass 99 detail filters (at level 2) and a signal that passes one approximate filter (at level 2). The decomposing unit 102a repeats this processing until the level reaches a maximum level k (in the case of FIG. 7, level 5) to obtain the decomposition detail coefficients $d_1$ to $d_k$ and an approximation coefficient $a_k$. The degree of the pinwheel framelets used herein may be changed according to the level. In normal multiresolution decomposition, the decomposing unit 102a puts the signals obtained in the decomposition phase and consisting of the decomposition detail coefficients $d_1$ to $d_5$ through the filter bank in the synthesis phase and, in the present embodiment, performs the coefficient processing according to the present embodiment to obtain decomposition detail coefficients $d_1'$ to $d_5'$ for synthesis phase input.

In other words, as illustrated in FIG. 6, the coefficient processing unit 102b of the decomposing unit 102a performs, between the decomposition phase and the synthesis phase in the multiresolution decomposition, coefficient processing on decomposition detail coefficients such that, the larger the energy of the decomposition detail coefficients is, the more small values are reduced, and the smaller the energy of the decomposition detail coefficients is, the more small values are increased (step SA-2). Here, for the color components of a* and/or b* of the image data, the coefficient processing unit 102b may perform coefficient processing that is corrected such that the larger the energy that is determined from the decomposition detail coefficients of a* and/or b* and the decomposition detail coefficients of L* is, the more small values are further reduced, and the smaller the energy is, the more small values are increased. The coefficient processing unit 102b may perform a normalization to make the values of the decomposition detail coefficients easy to handle in the coefficient processing, such as function processing and/or energy calculations. FIG. 8 is a flowchart of an example of coefficient processing on decomposition detail coefficients accompanying normalization.

Figure 8:
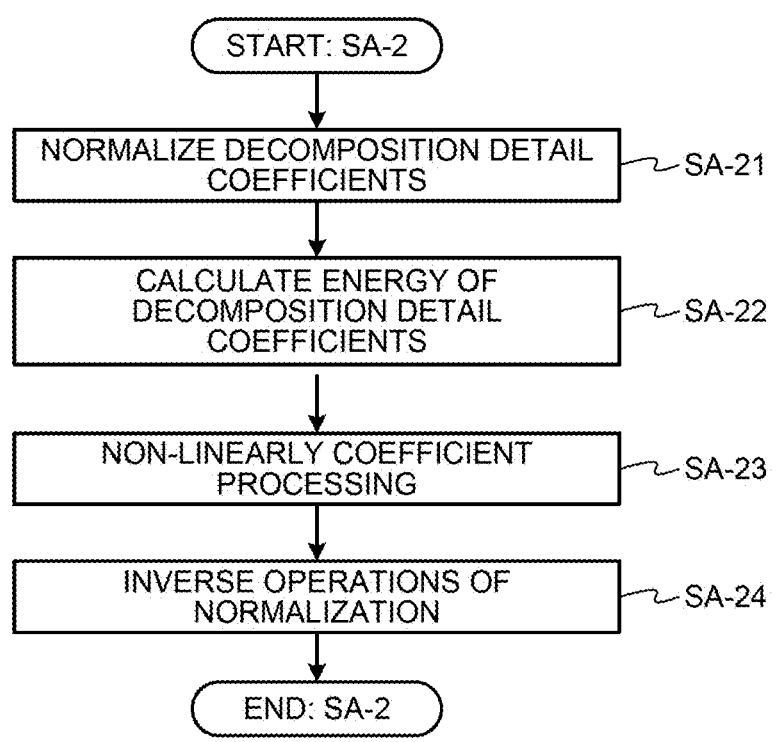
FIG. 8 is a flowchart showing an example of coefficient processing on decomposition detail coefficients accompanying normalization.

As illustrated in FIG. 8, at first, the coefficient processing unit 102b normalizes an absolute value of decomposition detail coefficients x (step SA-21). For example, the coefficient processing unit 102b normalizes the decomposition detail coefficients x by using an appropriate normalization method such that all decomposition detail coefficients x are numerical values between 0 and 1.

The coefficient processing unit 102b calculates the energy of the decomposition detail coefficients on the basis of the normalized decomposition detail coefficients y (step SA-22). For example, the coefficient processing unit 102b may use the squared norm $\|y\|$ of the decomposition detail coefficients y as the energy. Index adjustment, such as normalization, to allow the energy to be dealt with in the function processing may be performed.

The coefficient processing unit 102b obtains a coefficient processing result z by non-linearly performing coefficient processing on the normalized decomposition detail coefficients y (step SA-23). For example, in order to perform coefficient processing according to the magnitude of energy, the coefficient processing unit 102b may set a threshold for energy value and perform different types of coefficient processing for the respective energy value ranges, or may perform, without setting any threshold for energy value, coefficient processing by performing operations using a function with which the variations change continuously according to the energy value. For example, in order to perform the forward processing, the coefficient processing unit 102b may perform, coefficient processing using an SN function that varies continuously in an S-shaped curve when the energy of the decomposition detail coefficients is large, and in an N-shaped curve when the energy is small. The following Equation 1 represents an example of the SN function (see Non Patent Literature 2). According to Equation 1, an S-shaped curve is represented if $\alpha>1$, a straight line is represented if $\alpha=1$, and an N-shaped curve is represented if $\alpha<1$. The method of determining the correspondence between the energy and parameter $\alpha$ is not limited to one. It may be set according to the individual difference or set per level, orientation, color component, or sign of decomposition detail coefficient.

$$z=y^{\alpha}/\{y^{\alpha}+(1-y)^{\alpha}\} \quad \text{(Equation 1)}$$

(where y denotes normalized decomposition detail coefficients ($0 \leq y \leq 1$), $\alpha$ denotes an index value according to the energy of the normalized detail coefficients ($0 \leq \alpha$), and z denotes normalized decomposition detail coefficients on which function processing has been performed.). In order to perform reverse processing, the coefficient processing unit 102b may perform coefficient processing, without being limited to the above, using an SN function that varies continuously in an N-shaped curve when the energy of the decomposition detail coefficients is large, and in an S-shaped curve when the energy of the decomposition detail coefficients is small.

The coefficient processing unit 102b obtains input data x' to the synthesis phase by performing inverse operations of the normalization on the normalized decomposition detail coefficients z on which the coefficient processing has been performed at step SA-23 (SA-24). If the above-described norm is used, the sign is restored according to the following Equation:

$$x'=\text{sgn}(x)z'$$

(where x denotes decomposition detail coefficients, z denotes the value after the coefficient processing and z' denotes a value resulting from inverse operations of the normalization. If $x \geq 0$, $\text{sgn}(x)=1$, and if $x<0$, $\text{sgn}(x)=-1$. Note that x' denotes a value resulting from restoring of the sign.).

The following description refers back to FIG. 6. The decomposing unit 102a performs processing in the synthesis phase using, as input data, the decomposition detail coefficients on which the coefficient processing has been performed at step SA-2 (step SA-3). In other words, from the signals obtained by performing coefficient processing on the signals that are output from the decomposition phase, the decomposing unit 102a finally obtains 99×5 subband signals (detail parts) and one subband signal (approximate part) by the filters of the synthesis phase (see FIG. 7).

The reconstructing unit 102c reconstructs an image by summing the subband signals obtained by the decomposing unit 102a (step SA-4). If the numerical value of the color component obtained by summing the subband signals exceeds a specified value (e.g., gradation range of 0 to 255), the reconstructing unit 102c may keep the numerical value within the given range (e.g., range of 0 to 255) using, for example, a linear or non-linear method, values smaller than a lowest specified value (e.g., 0) may be regarded as the lowest specified value, and values equal to or larger than a highest specified value may be replaced with 255 (the method using a threshold). In addition to this, if necessary (for example, if RGB output is necessary), the color space converting unit 102d may perform processing, such as conversion of the color space or synthesis of the color components. If reverse processing is performed at step SA-2, the reconstructing unit 102c can obtain an illusion-considered image as a reconstructed image at step SA-4 and accordingly it is unnecessary to perform the following processing.

The illusion amount quantifying unit 102f quantifies the amount of illusion by calculating the ratio or difference in the color components between the original image data before performing of the above-described processing and the reconstructed image data that is generated by the reconstructing unit 102c (step SA-5). For example, the illusion amount quantifying unit 102f may calculate, as an amount of illusion, a difference (including an absolute value or the square of the difference) or ratio (including rate, proportion, percentage, etc.) in the value of L*, a* or b* at the same set of pixel coordinates between the image data and the reconstructed image data. The illusion amount quantifying unit 102f may integrate the differences in the values of L*, a* and *b and calculate an overall amount of illusion by using a color difference that is a square-root of sum of squares of the differences. After quantifying the amount of illusion, the illusion amount quantifying unit 102f may output the numerical value of the quantified amount of illusion to the output device 114 or may plot the amount of illusion on a graph and outputs the graph to the output device 114. For example, the illusion amount quantifying unit 102f may plot the amount of illusion on a graph at a set of coordinates on the cross-sectional line across the image and display the graph on the output device 114. The illusion amount quantifying unit 102f may further implement a three-dimensional display for a two-dimensional image using the amount of illusion serving as the height.

Here is the end of descriptions of the basic processing performed by the illusion analyzing apparatus 100. The reconstructed image that is obtained by performing the above-described processing including the forward processing is obtained by performing the image processing according to the embodiment on the original image. For example, natural image processing is performed that leads to an image much closer to the human perception than the original image is. The principle of the natural image processing that can be performed according to the present embodiment is that, while the human visual information processing is provided with advanced processing functions, they may lead to perception of illusions. The fact according to the present embodiment that the mathematical model based on the human visual information processing can express an illusion as a human being does proves that processing similar to the visual information processing in the brain is performed. Accordingly, by comparing the processed image that derives from the processing similar to the visual information processing in the brain and the original image, the quantified amount of illusion can be obtained.

[Example of Coefficient Processing]

An example of the coefficient processing performed by the coefficient processing unit 102b of the illusion analyzing apparatus 100 will be given below.

In order to mathematically describe a phenomenon that weak stimulus is reduced when the quantity of surrounding stimulus is large, and that weak stimulus is enhanced when the quantity of surrounding stimulus is small, is considered a function that deforms continuously from a function with an S-shaped graph into a function with an N-shaped graph. A function with such properties is referred to as a perceptual function. The following SN function is taken as an exemplary perceptual function.

$$s(t, \alpha) = \frac{t^\alpha}{t^\alpha + (1-t)^\alpha}, 0 \le t \le 1, 0 \le \alpha$$ [Expression 1]

Here, X denotes an original image and $X=(X_1, X_2, X_3)$ represents a display in a color space. For example, when the CIELAB color space is used, $X_1$ denotes data of L*, $X_2$ denotes data of a*, and $X_3$ denotes data of b*.

$X_\mu$ ($\mu=1, 2, 3$) is decomposed using a pinwheel framelet. In this example, a case will be descried where the number of pixels of X is 512×512 pixels and decomposition is performed using a pinwheel framelet of degree 5 ($(5-1)^2+(5+1)^2=52$) at level 8 (even with a differ number of pixels and a different pinwheel framelet, etc., decomposition can be performed in the same manner.)

The decomposed data of $X_\mu$ can be expressed by the following Equation (where l, p, j and k are integers).

$$(x_\mu[l,p;j,k])_{0 \le j,k \le 511}; 1 \le p \le 52, 1 \le l \le 8, \mu=1,2,3$$ [Expression 2]

Here, $(x_\mu[l,1;j,k])_{0 \le j,k \le 511}$ denotes decomposition approximate coefficients of the pinwheel framelet and $(x_\mu[l,p;j,k])_{0 \le j,k \le 511}$ ($2 \le p \le 52$) denotes the decomposition detail coefficients of the pinwheel framelet. Hereinafter, let $2 \le p \le 52$.

Let $\phi_{\mu,l,p}$ be an appropriate function of two variables and set the following expression ($\mu=1, 2, 3$).

$$z_\mu[l,p;j,k] = \phi_{\mu,l,p}(x_1[l,p;j,k], x_\mu[l,p;j,k])$$ [Expression 3]

For example, set the following (where $a_1$ and $a_2$ are appropriate normalized constants; $\mu=1, 2, 3$).

$$\phi_{\mu,l,p}(s,t) = |s|/a_1,$$

$$\phi_{\mu,l,p}(s,t) = |s|/a_1 + |t|/a_2$$ [Expression 4]

Set also the following.

$y_\mu^0[l;p]$ denotes a normalized $l^2$ norm of $(z_\mu[l,p;j,k])_{0 \le j,k \le 511}$ ($\mu=1,2,3$). [Expression 5]

$b_1, b_2, b_3$ and $b_4$ denote non-negative real numbers and they may be changed according to $\mu$ and each level l. Furthermore, they may be changed according to the orientation p from among the decomposition detail coefficients of the pinwheel framelet. They may be changed per sign of decomposition detail coefficients.

$$y_\mu[l, p] \text{ is set for } y_\mu^0[l, p]^{b_3}$$ [Expression 6]

$$\alpha_\mu[l, p] = (b_2 - b_1)s(y_\mu[l, p], b_4) + b_1$$ [Expression 7]

$$= (b_2 - b_1)\frac{y_\mu[l, p]^{b_4}}{y_\mu[l, p]^{b_4} + (1 - y_\mu[l, p])^{b_4}} + b_1$$

$y_{\mu,1}[l,p;j,k]$ denoting a value between 0 and 1 obtained by performing an appropriate normalization on the absolute value of $x_\mu[l,p;j,k]$. Set the following, where the SN function s may be replaced with an appropriate perceptual function.

[Expression 8]

$$y_{\mu,2}[l, p; j, k] = s(y_{\mu,1}[l, p; j, k], \alpha_\mu[l, p])$$

$$= \frac{y_{\mu,1}[l, p; j, k]^{\alpha_\mu[l,p]}}{y_{\mu,1}[l, p; j, k]^{\alpha_\mu[l,p]} + (1 - y_{\mu,1}[l, p; j, k])^{\alpha_\mu[l,p]}}$$

$y'_\mu[l,p;j,k]$ denotes the result of multiplying $y_{\mu,2}[l,p;j,k]$ by the signum function of $x_\mu[l,p;j,k]$ and performing inverse operations of the normalization on the result.

$X'_\mu$ ($\mu=1, 2, 3$) denotes the data reconstructed by applying the pinwheel framelet synthesis filter to $y'_\mu[l,p;j,k]$. Put $X'=(X'_1, X'_2, X'_3)$.

X' denotes the image obtained by processing X. In the example of processed image, for $b_1, b_2, b_3$ and $b_4$, L* is the same regarding orientation components per level and, a* and b* are set per level according to the horizontal, vertical, diagonal orientations etc.

The function for performing forward processing is described above. By switching the content of coefficient processing according to the magnitude of energy, a function for performing reverse processing can be created. More specifically, the above-described $b_1, b_2, b_3$ and $b_4$ are determined appropriately and the result of multiplying the right hand side of the equation of the left hand side $\alpha_\mu[l,p]$ is replaced with $\alpha_\mu[l,p]$ again, which serves as an example of the coefficient processing of the reverse processing.

In order to make it further close to the human visual perception, the processing method may be changed according to the difference in the sign of $x_\mu[l,p;j,k]$. Exemplary processing where independent processing is performed according to the difference in the sign of decomposition detail coefficients.

As in the above-described case, X denotes an original image and the number of pixels of X is 512×512 pixels (the number of pixels is not limited to this). Because X is composed of L*, a*, and b*, $X_1$, $X_2$ and $X_3$ correspond to L*, a*, and b*, respectively.

Each $X_\mu$ ($\mu$=1, 2, 3) is decomposed using a pinwheel framelet to the level 8. In this example, in consideration for the properties of the orientation selectivity of simple cells in V1 of the cerebral cortex, the degree of the pinwheel framelet is changed per level.

In other words, the pinwheel framelet of degree 7 is used at levels 1 to 3, the pinwheel framelet of degree 5 is used at levels 4 to 6, and the pinwheel framelet of degree 3 is used at levels 7 and 8. If $n_l$ denotes the number of the filters of the pinwheel framelet used at level l, the followings are set in this example.

$$n_1=n_2=n_3=(7-1)^2+(7+1)^2=100$$

$$n_4=n_5=n_6=(5-1)^2+(5+1)^2=52$$

$$n_7=n_8=(3-1)^2+(3+1)^2=20$$

The decomposition coefficients of the pinwheel framelet to level 8 are as follows.

$$(x_\mu[l,p;j,k])_{0 \leq j,k \leq 511}; 1 \leq p \leq n_l, 1 \leq l \leq 8, \mu=1,2,3 \quad \text{[Expression 9]}$$

The processing method is changed according to the difference in the sign of $x_\mu[l,p;j,k]$. First, the value of +1 or −1 is allocated for s(l,p) according to the type (even, odd or mixed type) of the filter. For example, if the form of the filter corresponding to l,p is a positive even type, +1 is allocated; if it is negative even type, −1 is allocated; and if it is odd or mixed type, +1 is allocated.

$$x_\mu^{(0)}[l,p;j,k]=\max(0,sp(l,p)x_\mu[l,p;j,k])$$

$$x_\mu^{(1)}[l,p;j,k]=\max(0,sp(l,p)x_\mu[l,p;j,k]) \quad \text{[Expression 10]}$$

$$(y_{\mu,1}^{(i)}[l,p;j,k])_{0 \leq j,k \leq 511} \quad \text{[Expression 11]}$$

denotes the result of an appropriate normalization on $(x_\mu^{(i)}[l, p; j, k])_{0 \leq j,k \leq 511}$. From $(x_\mu^{(i)}[l, p; j, k])_{0 \leq j,k \leq 511}$, an index for non-linearly processing is determined according to, for example, the following method:

$$z_\mu^{(i)}[l,p;j,k]=\phi_{\mu,l,p}(x_1^{(i)}[l,p;j,k],x_\mu^{(i)}[l,p;j,k]).$$

Here $\phi_{\mu,l,p}$ is defined as follows:

$$\phi_{1,l,p}(s,t)=|s|/a_{11},$$

$$\phi_{2,l,p}(s,t)=|s|/a_{21}+|t|/a_{22},$$

$$\phi_{3,l,p}(s,t)=|s|/a_{31}+|t|/a_{32}, \quad \text{[Expression 12]}$$

where $a_{11}, \ldots, a_{32}$ are appropriate normalized constants.

$y_\mu^0[i;l,p]$ denotes a normalization norm of $(z_\mu^{(i)}[l,p;j,k])_{0 \leq j,k \leq 511}$. [Expression 13]

$$\alpha_\mu^{(i)}[l,p]=b_{1,j} \times y_\mu^0[i;l,p]^{b_{23}}+B_{3,j} \quad \text{[Expression 14]}$$

The above is set, where $b_{1,i}$, $b_{2,i}$, and $b_{3,i}$ are constants that can be determined experimentally. Set following to perform non-linear processing.

$$y_{\mu,2}^{(i)}[l, p; j, k] = s(y_{\mu,1}^{(i)}[l, p; j, k], \alpha_\mu^{(i)}[l, p]), \quad \text{[Expression 15]}$$

$$\text{where } s(t, \alpha) = \frac{t^\alpha}{t^\alpha + (1-t)^\alpha}.$$

$$y_{\mu,2}^{(0)}[l,p;j,k]' \quad \text{[Expression 16]}$$

denotes the result of performing inverse operations of the normalization on $sp(l,p) \times y_{\mu,2}^{(0)}[l,p;j,k]$. Furthermore, $y_{\mu,2}^{(1)}[l,p;j,k]'$ denotes the result of performing inverse operations of the normalization on $-sp(l,p) \times y_{\mu,2}^{(1)}[l,p;j,k]$. Set the following:

$$y'_\mu[l,p;j,k]=y_{\mu,2}^{(0)}[l,p;j,k]'+y_{\mu,2}^{(1)}[l,p;j,k]'.$$

$X'_\mu$ ($\mu$=1, 2, 3) denotes the image data that is reconstructed by applying synthesis filters of the pinwheel framelet to the above-described $y'_\mu[l,p;j,k]$. Set $X'=(X'_1, X'_2, X'_3)$. Then X' is the image obtained by processing X.

Here is the end of descriptions of specific processing performed by the illusion analyzing apparatus 100.

[Simulation of Color Contrast Illusion]

In order to check whether the mathematical model used in the present embodiment is close to the human visual information processing, a color contrast illusion image was used as an original image and the processing according to the present embodiment described above was performed. In other words, because, if the mathematical model is close to the human visual information processing, a calculator in which the mathematical model is installed calculates illusions, it was checked whether it is possible to simulate human illusions actually according to the present embodiment.

Figure 9:
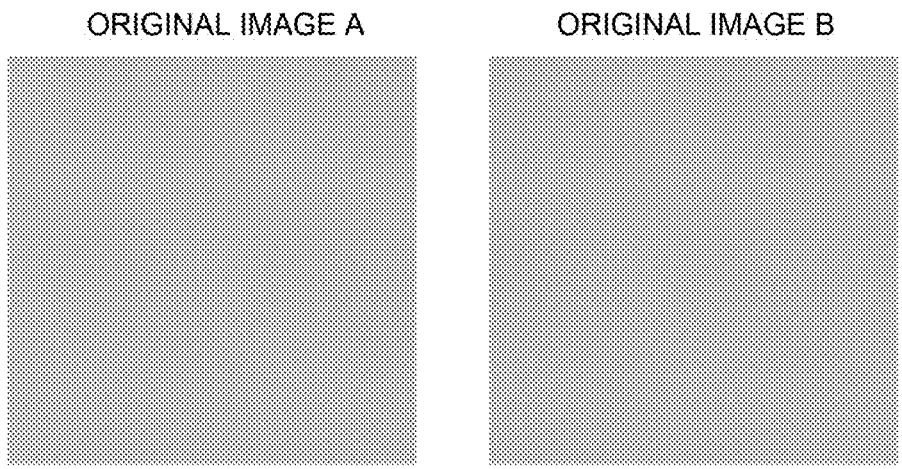
FIG. 9 is a diagram showing an example of color contrast illusion images.
Figure 10:
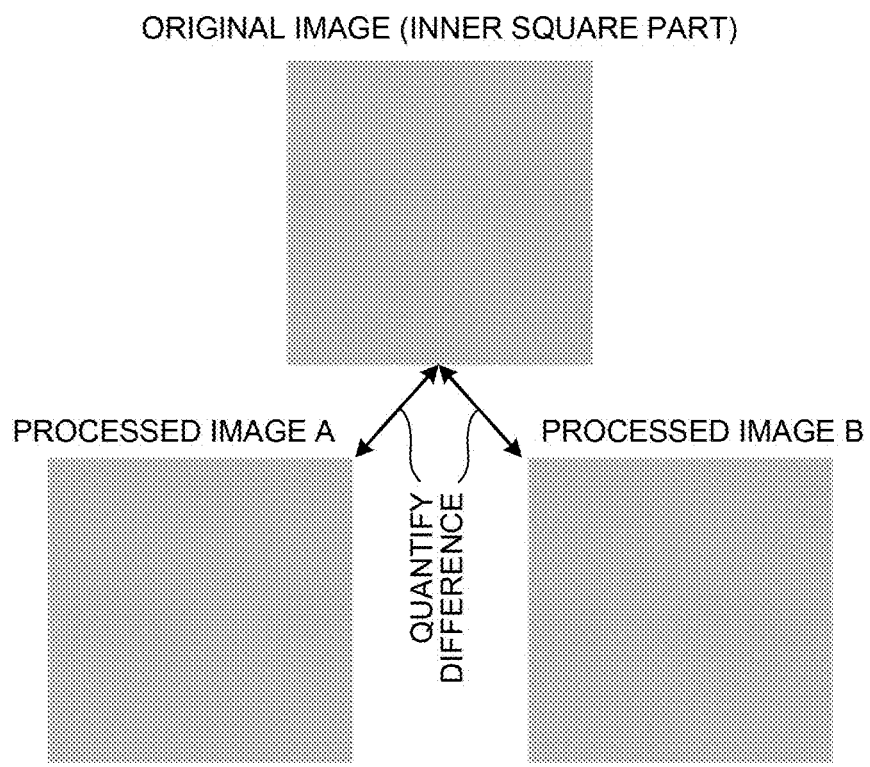
FIG. 10 is a diagram showing the inner square part of the original image in FIG. 9 (common between the original images A and B), the inner square part of the processed image A resulting from processing of the original image A, and the inner square part of the processed image B resulting from processing of the original image B.

FIG. 9 is a diagram showing an example of color contrast illusion images. In FIG. 9, the inner square parts of the left image (original image A) and the right image (original image B) have the same lightness, brightness and color. However, depending on the arrangement of the surrounding color, an illusion occurs where it looks in a different color according to the human visual information processing. Thus, image processing was performed on the original image A and the original image B using the illusion analyzing apparatus 100 according to the present embodiment. FIG. 10 is a diagram showing the inner square part (common between the original images A and B) of the original image, the inner square part of the processed image A resulting from processing of the original image A, and the inner square part of the processed image B resulting from processing of the original image B.

As shown in FIG. 10, as a result of performing image processing using the illusion analyzing apparatus 100 of the present embodiment, the inner square part of the processed image A corresponding to the original image A was expressed more vividly than it actually is and the inner square part of the processed image B corresponding to the original image B was expressed more dully than it actually is, which is similar to how the original images A and B look to human beings (illusion). Accordingly, it can be concluded that the image processing performed by the illusion analyzing apparatus 100 according to the embodiment is close to the human visual information processing. Thus, as the drawings show, it was confirmed that the amount of illusion can be quantified by calculating the differences in color component values between the original image and the processed image.

Figure 11:
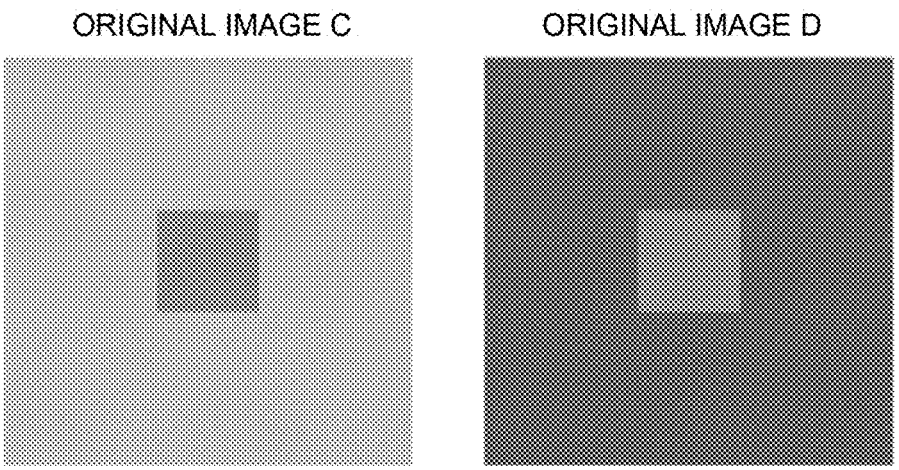
FIG. 11 is a diagram showing another example of color contrast illusion images.
Figure 12:
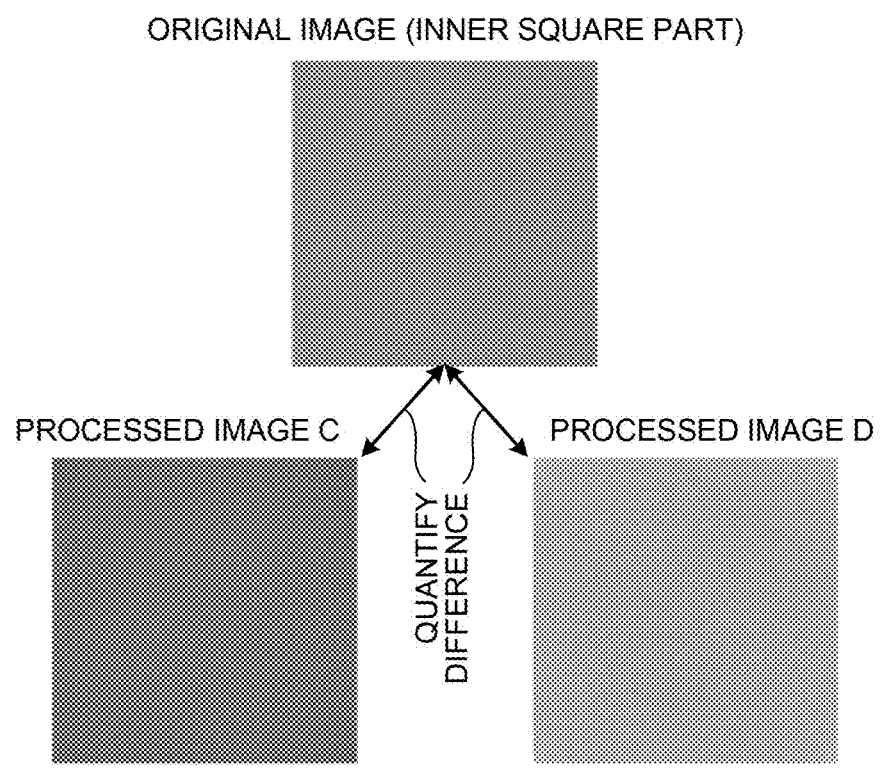
FIG. 12 is a diagram showing the inner square part of the original image in FIG. 11 (common between the original images C and D), the inner square part of the processed image C resulting from processing of the original image C, and the inner square part of the processed image D resulting from processing of the original image D.

FIG. 11 is a diagram showing other exemplary color contrast illusion images. Similar to the above case, the inner square parts of the left image (original image C) and the right image (original image D) in FIG. 11 have the same lightness, brightness and color. FIG. 12 is a diagram showing the inner square part of the original image (common between the original images C and D), the inner square part of the processed image C resulting from processing the original image C, and the inner square part of the processed image D resulting from processing the original image D.

As shown in FIG. 12, as a result of performing image processing using the illusion analyzing apparatus 100 of the present embodiment, the inner square part of the processed image C corresponding to the original image C was expressed darker than it actually is and the inner square part of the processed image D corresponding to the original image D was expressed lighter than it actually is, which is similar to how the original images C and D look to human beings (illusion). Thus, as the drawings show, it was confirmed that the amount of illusion can be quantified by calculating the differences in color component values between the original image and the processed image.

Figure 13:
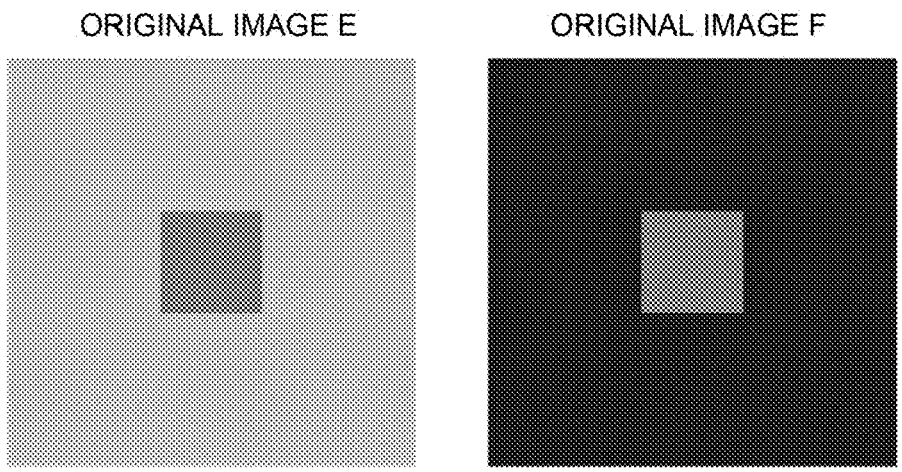
FIG. 13 is a diagram showing still another example of color contrast illusion images.
Figure 14:
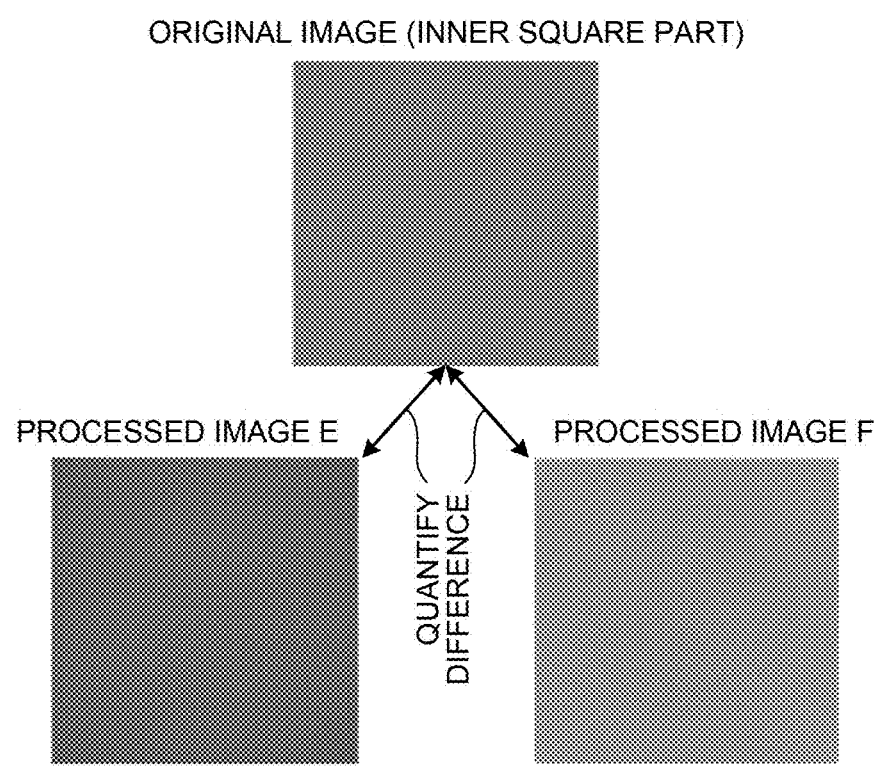
FIG. 14 is a diagram showing the inner square part of the original image in FIG. 13 (common between original images E and F), the inner square part of the processed image E resulting from processing of the original image E, and the inner square part of the processed image F resulting from processing of the original image F.

FIG. 13 is a diagram illustrating still other exemplary color contrast illusion images. Similar to the above case, the inner square parts of the left image (original image E) and the right image (original image F) in FIG. 13 have the same lightness, brightness and color. FIG. 14 is a diagram showing the inner square part of the original image (common between the original images E and F), the inner square part of the processed image E resulting from processing the original image E, and the inner square part of the processed image F resulting from processing the original image F.

As shown in FIG. 14, as a result of performing image processing using the illusion analyzing apparatus 100 of the present embodiment, the inner square part of the processed image E corresponding to the original image E was expressed darker than it actually is and the inner square part of the processed image F corresponding to the original image F was expressed lighter than it actually is, which is similar to how the original images E and F look to human beings (illusion). In this example, the effect of performing processing in consideration for the value of $L^*$ in the processing of $a^*$ and $b^*$ is significantly represented. Accordingly, as the drawings show, it was confirmed that the amount of illusion can be quantified by calculating the differences in color component values between the original image and the processed image.

As a result, it was confirmed that the image processing performed by the illusion analyzing apparatus 100 according to the present embodiment is extremely close to the human visual information processing. Accordingly, by performing the image processing according to the present embodiment using the mathematical model close to the human visual information processing, the information processing close to the human visual system is performed on the original image so that a natural processed image perceived by a human being can be provided. Thus, next, the difference between an original image and a processed image close to the image perceived in the brain was calculated to quantify the amount of illusion. FIG. 15 is a diagram obtained by plotting, as the amount of illusion, the differences in the value of $L^*$, the value of $a^*$, and the value of $b^*$ at the set of coordinates of the center in the inner square parts between the original image and the processed image and the synthesis scores thereon. The vertical axis represents the quantified amount of illusion and the horizontal axis represents the numbers 1 to 9 of nine types of original images.

Figure 16:
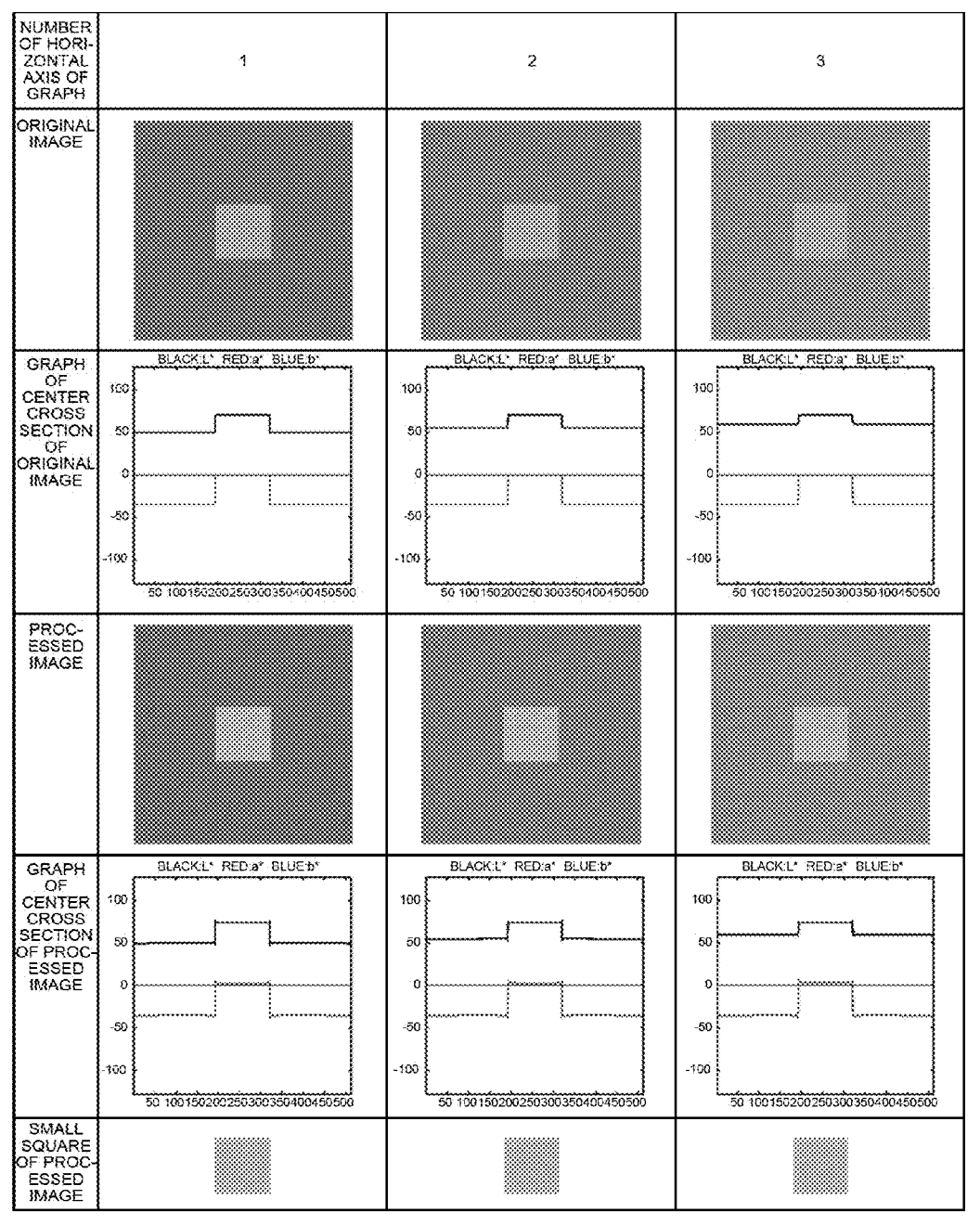
Figure 17:
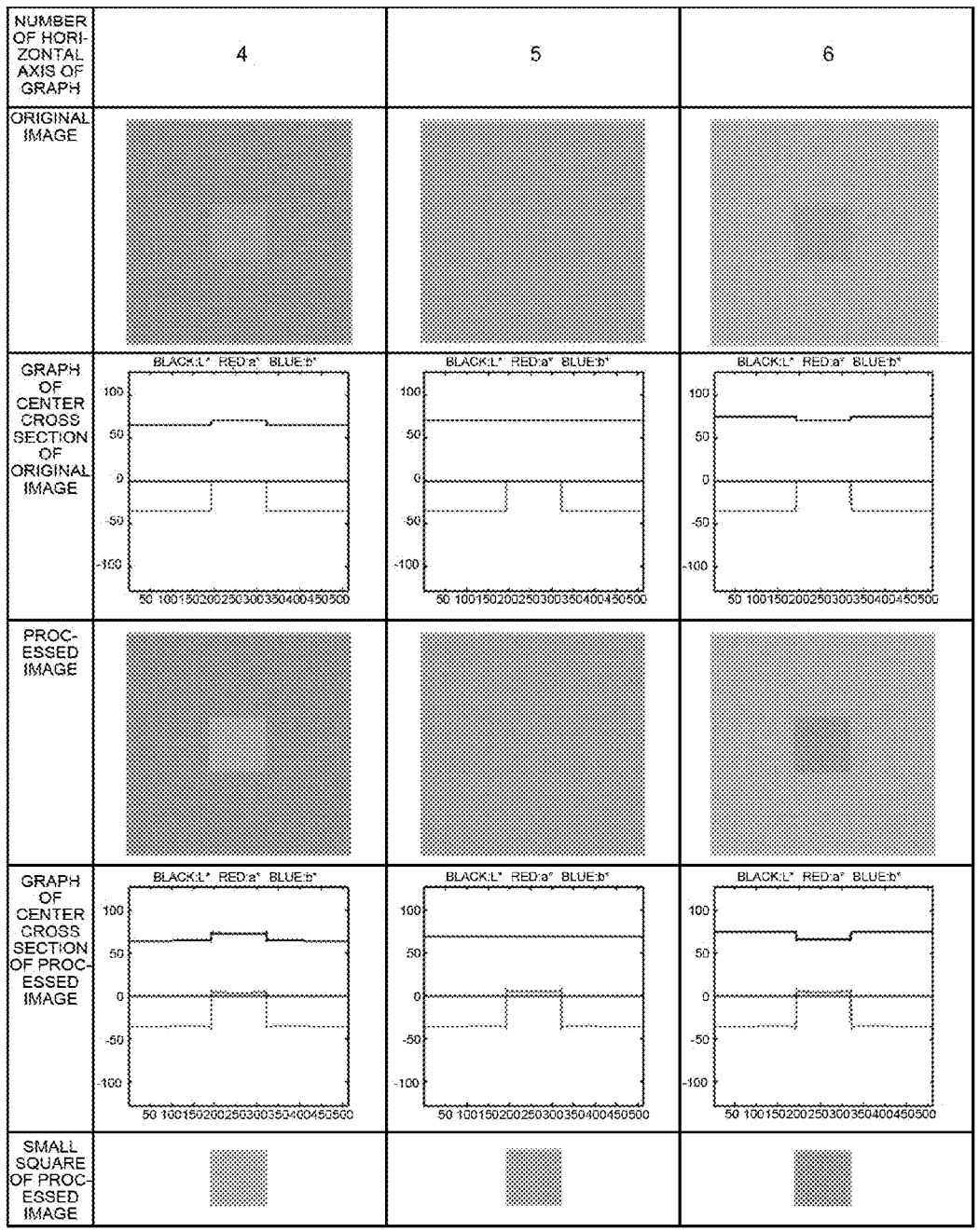
FIG. 17 is a diagram showing the original images of Numbers 4 to 6, the graphs of L*, a* and b* at the center cross sections of the original images, the processed images corresponding to the original images, and the graphs of L*, a* and b* at the center cross sections of the processed images.
Figure 18:
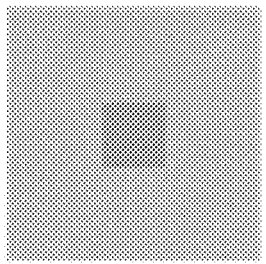
FIG. 18 is a diagram showing the original images of Numbers 7 to 9, the graphs of L*, a* and b* at the center cross sections of the original images, the processed images corresponding to the original images, and the graphs of L*, a* and b* at the center cross sections of the processed images.

FIGS. 16 to 18 are diagrams showing the nine types of original images, the graphs of $L^*$, $a^*$ and $b^*$ on the center cross sections of the original images, processed images corresponding to the original images, and the graphs of $L^*$, $a^*$ and $b^*$ on the center cross sections of the processed images.

As the graphs of the original images show, the inner square parts of the original images are common among the nine types of images and only the outer lightness (the value of $L^*$) is changed.

FIG. 15 is the graph obtained by plotting, as the amount of illusion, the differences in the values at the center coordinates of the processed images based on the nine types of original images. As shown in FIG. 15, at number 5, while the amount of illusion by lightness (the value of $L^*$) is at minimum, the amount of illusion by $a^*$ is at maximum. This result matches the Kirschmann's third law defining that "the color contrast is at maximum when the lightness contrast is at minimum" and also proves that the image processing according to the embodiment is similar processing to the visual information processing in the brain.

FIG. 19 is a diagram that contrasts an original image where the lightness of the inner small square and the lightness of the outer large square are uniform and an original image where the lightness of the inner small square and the lightness of the outer large square are greatly different from each other. As shown in FIG. 19, as the Kirschmann's law defines, although the inner small square is common to both the original images, it looks reddish to the human's eyes with uniform lightness. When the inner small rectangle of the processed image obtained according to the present embodiment is taken out such that the color contrast illusion is reflected, the redness increases to pink with the uniform lightness. Against the Kirschmann's law defining that "the color contrast is at maximum when the brightness contrast is at minimum", there is a counterargument that the illusion is at maximum when there is a slight difference in lightness than when it is uniform.

Thus, as shown in FIG. 15, the color difference that is a square-root of sum of squares of the differences in the values of $L^*$, $a^*$ and $b^*$ between the original image and the processed image is calculated as a synthesis score of the amounts of illusion of these color components. As a result, as shown in FIG. 15, it was shown that the overall amount of illusion is largest not in number 5 with uniform lightness but in number 6 with a slight difference in lightness. Accordingly, it was confirmed that in consideration for not only color illusion depending on the value of $a^*$ but also lightness illusion depending on the value of $L^*$, the counterargument against the Kirschmann's law is met.

[Example of Color Contrast Illusion]

An example of quantifying of the amount of illusion of color contrast illusion will be described here as a specific example. In the present example, it was examined how a given color look due to the contrast illusion according to the embodiment.

Figure 20:
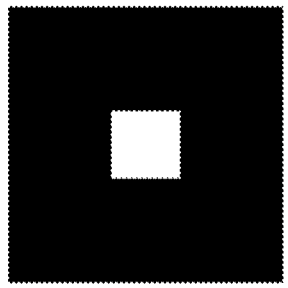
FIG. 20 is a basic pattern that is used in the present example.

FIG. 20 shows a basic diagram used in the present example. In the present example, patterns having the shape shown in FIG. 20 are dealt with. Alternatively, the basic patterns may be other than that shown in FIG. 20 or may be created according to the purpose.

In the present example, the color with which the area shown in black in FIG. 20 is colored is referred to as the "background color". In the present example, the color with which the center small square part is colored is referred to as the "examination color". The color that is derived by calculating, according to the resent invention, the illusion occurring to the center color depending on the background color is referred to as the "illusion color".

Figure 21:
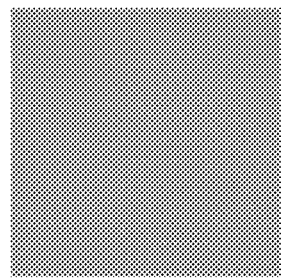
FIG. 21 is a diagram showing the examination color used in the present example.

FIG. 21 is a diagram showing the examination color used in the present example. In the present example, using the color in FIG. 21 as the examination color, it was examined how the examination color looks due to the effects of the color contrast illusion. Any examination color may be used and an examination color may be selected by any method, such as inputting of a value, using a color picker, or using a colorimeter.

In the present example, the background color was gradually changed in the basic pattern that is colored with the examination color in FIG. 21 and each pattern was processed by a method including the forward processing of the present embodiment. Some patterns each with a relatively larger amount of illusion and different illusion color tendencies were selected.

Figure 22:
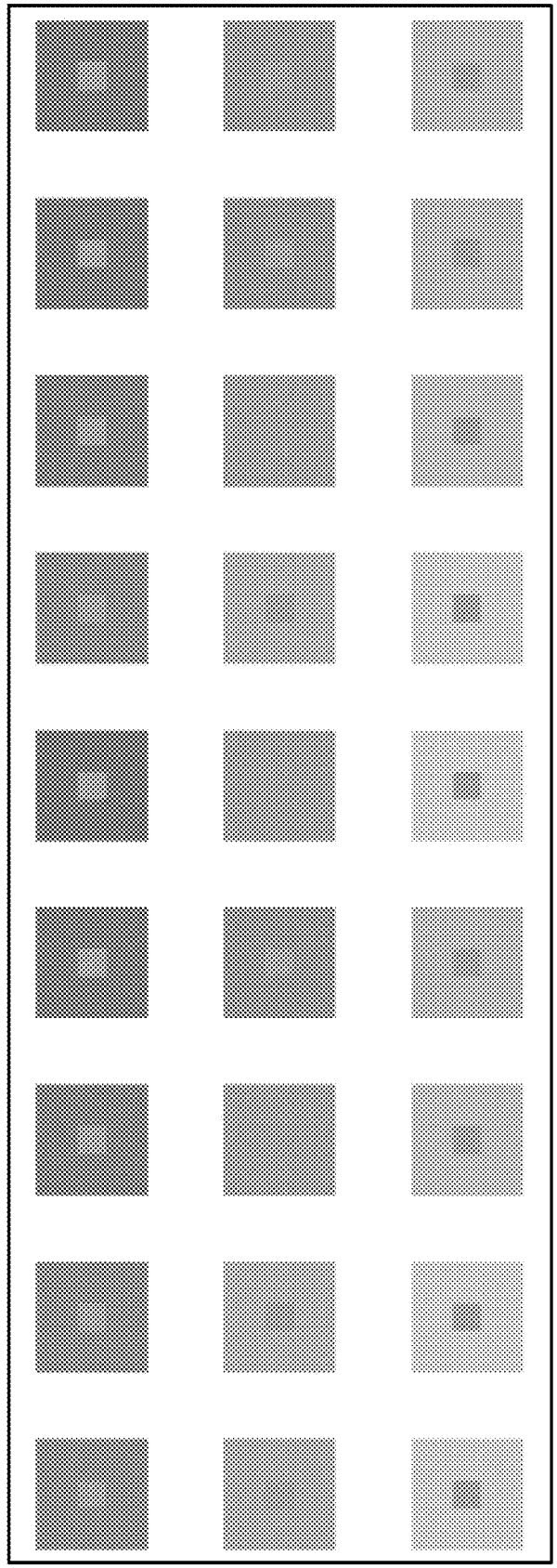
FIG. 22 is a diagram showing examples of the basic pattern each with a background color that is selected according to the processing result.
Figure 23:
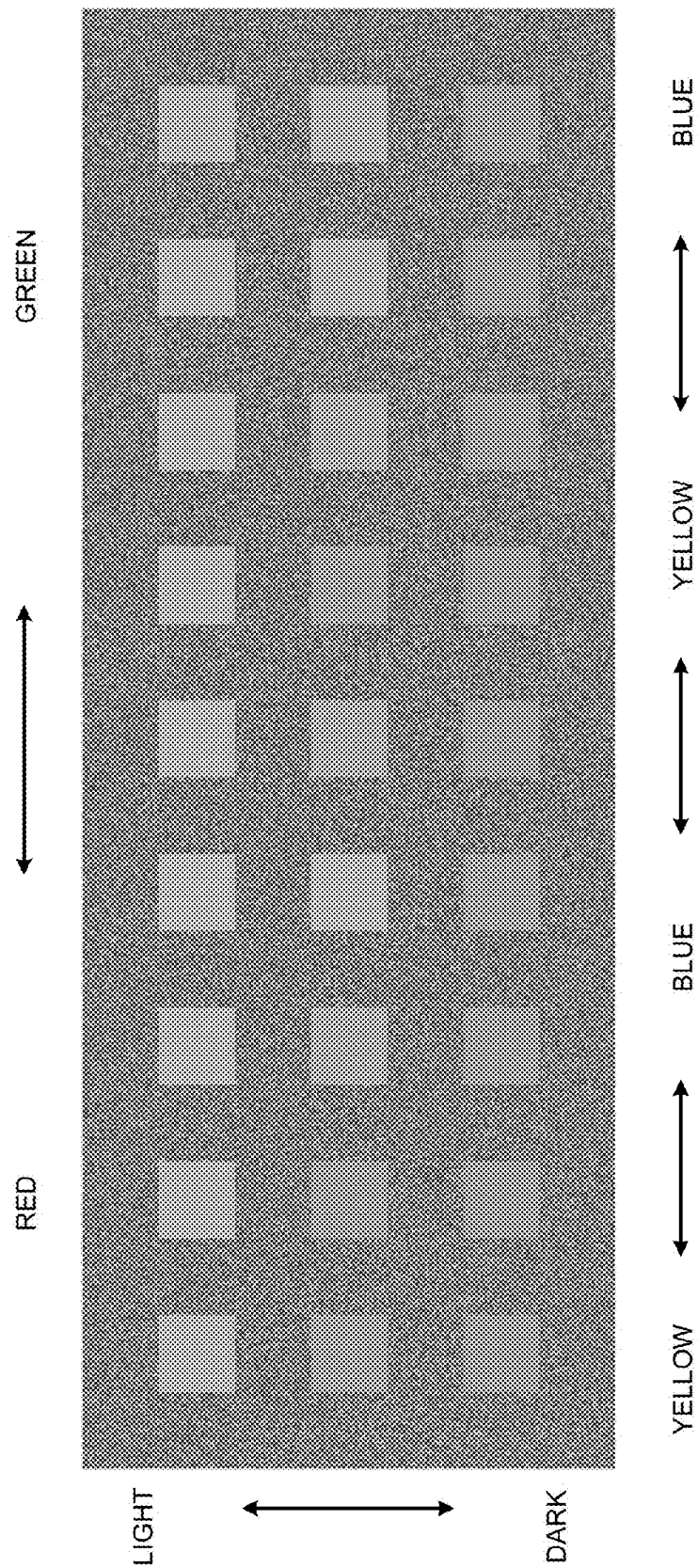
FIG. 23 is a diagram where illusion colors are arrayed that are derived by processing the basic patterns shown in FIG. 22 using a method including the forward processing of the present embodiment.

FIG. 22 is a diagram showing examples of the basic pattern each with a background color that is selected according to the processing result. FIG. 23 is a diagram where the illusion colors derived by processing the basic patterns in FIG. 22 using a method including the forward processing according to the embodiment are arrayed. In other words, each of the small squares shown in FIG. 23 is a small square that is colored not with an examination color before processing but with the color of the center of the processed image, i.e., an illusion color. The arrows in FIG. 23 denote which color tendency the illusion color has with respect to the examination color.

The background color at the center of FIG. 22 (if the title "COLOR CONTRAST ILLUSION" regarded as the top side of the drawing, at the second row from the top and the fifth one from the left) is the same color as the examination color and thus the color thereof is uniform. For this reason, no illusion occurs and the corresponding color at the center of FIG. 23 remains in the examination color. Using this as a reference to compare the amounts of illusion in FIG. 23 makes the comparison easy to understand.

In FIG. 23, in order to reduce occurrence of further illusion in the illusion colors, the background of each small square is randomly color-dotted; however, it is necessary to pay attention for the fact that, no matter which background is used, further illusion occurs in the background when the illusion colors are displayed.

The method of displaying the coefficient processing result can be changed according to the intended purpose to, for example, in addition to the methods shown in FIGS. 22 and 23, display by sequential change, display by numerical value, display by graph, or the like.

In the above-described example, each of the basic patterns may be processed each time, using the method according to the present embodiment; however, in order to increase the calculation speed, the previously-calculated processed results were used in a table form. More specifically, the differences obtained by changing the difference between the examination color and the background color at given intervals were processed, the differences each between the examination color and a background color and the differences each between the examination color and an illusion color were saved per color component as a table and the color differences each between the examination color and an illusion color were also saved as a tale.

Accordingly, even if the examination color is changed, the amount of illusion corresponding to the background color can be derived from the table at high speed because of the two reasons. The first reason is that the pinwheel framelet used in the present example decomposes an image into an average (approximate part) and changes (detail parts) and applies non-linear processing only to only the changes in the present example. The other reason is that the CIELAB color space is used in the present example. A color space with which the same change is perceived as the change in the color space is suitable to the present example. It is necessary to calculate the above-described table per basic pattern.

The above-described table method allows high-speed calculations and is suitable to examine the tendency of illusion colors. On the other hand, the method where calculation is performed each time is suitable for a complicated pattern or to know the illusion of a whole image. In the present examination, the examination color was specified. In the same manner, the background color may be specified.

According to the example, it was confirmed that it is useful in finding an effective color combination using color contrast illusion in printing, etc. and is useful in industries.

[Example for Scene Photograph]

Figure 24:
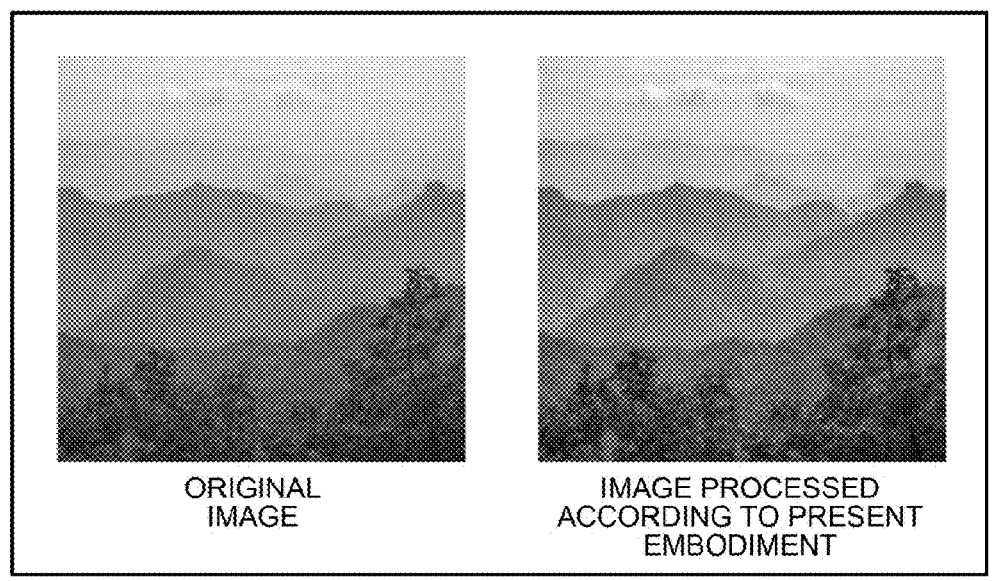
FIG. 24 is a diagram showing a contrast between an original image (512×512 pixels) and the image processed according to the embodiment.

In the above-described example, the case where an image to which a color scheme is applied is used is described. In addition to this, it is possible to quantify the amount of illusion for a photograph of a person or scene. FIG. 24 is a diagram showing a contrast between an original image and the image processed according to the present embodiment.

Figure 25:
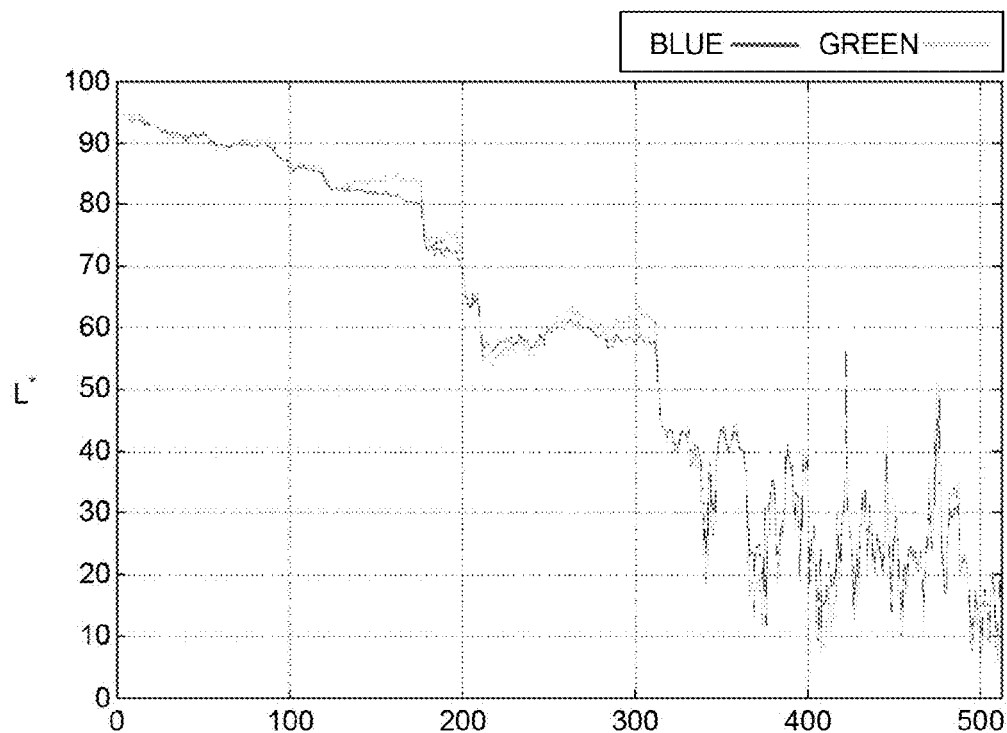
FIG. 25 is a graph representing the values of L* of the row of the 400th pixel from the left in each of the pictures in FIG. 24.
Figure 26:
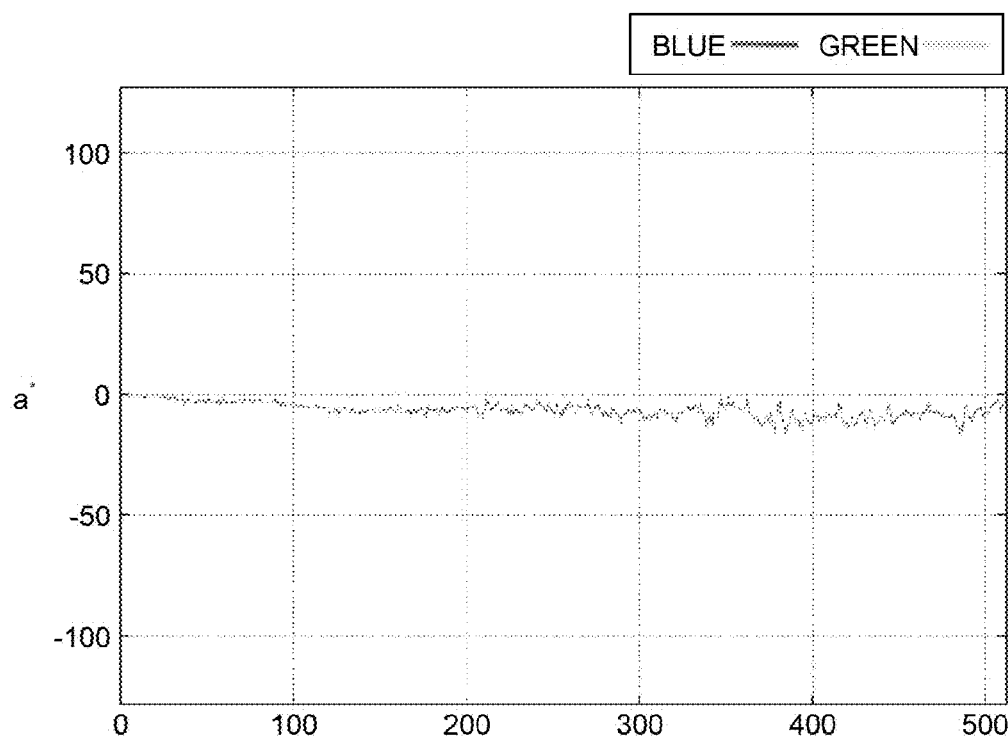
FIG. 26 is a graph representing the values of a* of the row of the 400th pixel from the left in each of the pictures in FIG. 24.
Figure 27:
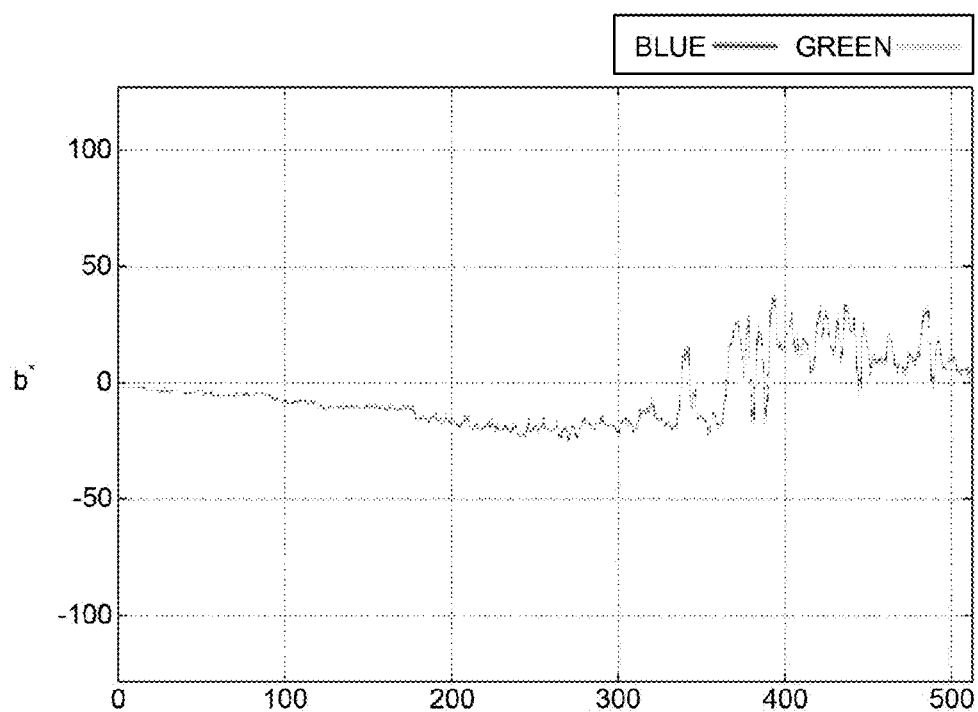
FIG. 27 is a graph representing the values of b* of the row of the 400th pixel from the left in each of the pictures in FIG. 24.

As shown in FIG. 24, according to the present embodiment, a processed image close to an image perceived in the brain can be obtained by performing processing similar to the human early visual information processing. FIGS. 25, 26 and 27 are graphs representing the values of L*, a* and b* of the row of the 400th pixel from the left in each of the photographs (512×512 pixels) in FIG. 24. The horizontal axis represents the number of lines from the top at the row of the 400th pixel from the left and the vertical axis represents the value of each color component (L*, a* and b*). Blue represents the graph representing values at the respective points of the original image and green represents the graph representing values at the respective points of the processed image according to the present embodiment.

In other words, in FIGS. 25 to 27, according to the present embodiment, for example, the difference between the value of the y axis of the original image and the value of the y axis of the processed image is calculated as the amount of illusion. As shown in the drawings, as for L*, the effect of the image processing is small for a short-distance view with significant variations (around 400 to 500 on the horizontal axis) and the effect of the image processing (amount of illusion) is large for a long-distance view with gentle variations (around 0 to 300 on the horizontal axis). Furthermore, not only the high-frequency portion but also the low-frequency portion is processed. For this reason, a natural image close to the human early visual information processing is obtained. In this manner, by calculating a difference between an original image and a processed image, the amount of illusion can be obtained even for a scene photograph, etc.

[Fitting Processing]

Figure 28:
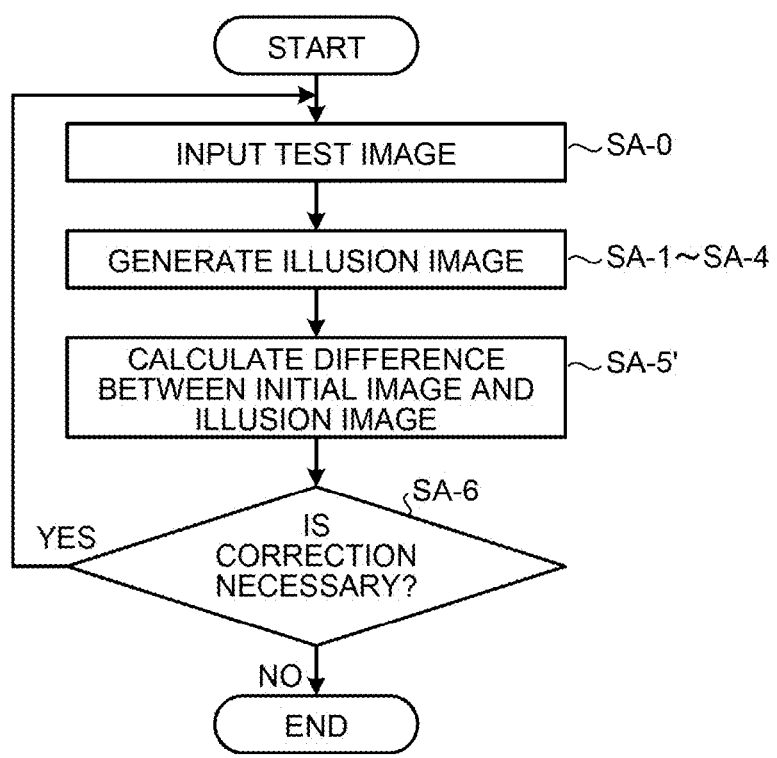
FIG. 28 is a flowchart showing an example of fitting processing performed by the illusion analyzing apparatus 100.

Fitting processing performed by the illusion analyzing apparatus 100 according to the present embodiment will be described below with reference to FIG. 28. The fitting processing is aimed at, for an arbitrary image (referred to as the "initial image"), obtaining an image for output like that perceived as the initial image in the human brain. In other words, conventionally, even when a person, such as an industrial designer, who designs a color scheme notices that it does not necessarily look according to an original image as the person intends to a third party, the person only adjusts the color scheme depending on the techniques acquired through professional experiences; however, the fitting processing is aimed at, by performing image editing using the amount of illusion as an index, obtaining an image for output that is perceived according to the initial image. FIG. 28 is a flowchart showing an example of fitting processing performed by the illusion analyzing apparatus 100.

As shown in FIG. 28, the image editing unit 102g inputs data of a desired initial image as a test image (step SA-0). The initial image data, which is arbitrary image data, may be image data that is created by a user using arbitrary graphic software or the like or image data that is captured via the input device 112, such as a digital camera.

The illusion analyzing apparatus 100 performs processing at steps SA-1 to SA-4 to generate an illusion image obtained by performing multiresolution decomposition on the test image and reconstructing the test image (steps SA-1 to SA-4).

The illusion amount quantifying unit 102$f$ calculates, as an amount of illusion, the difference in color components between the initial image data and the generated illusion image data (reconstructed image data) (step A-5'). For example, the illusion amount quantifying unit 102$f$ calculates, as an amount of illusion, the difference in the value of each of L*, a* and b* at the same set of coordinates of the same pixel between the image data and the reconstructed image data. The illusion amount quantifying unit 102$f$ then may visually make clear at which position and how much an illusion occurs by implementing, for a two-dimensional image, a three-dimensional display using the amount of illusion at each set of pixel coordinates as the height.

The image editing unit 102$g$ determines whether it is necessary to correct the test image data (step SA-6). For example, the image editing unit 102$g$ may determine that a correction is necessary if there is an amount of illusion equal to or larger than a given threshold at a given set of coordinates. The image editing unit 102$g$ may display "CORRECT TEST IMAGE?" AND "YES"/"NO" button and determine that a correction is necessary if the user clicks the "YES" button via the input device 112.

When it is determined that a correction is necessary (YES at step SA-6), the processing goes back to step SA-0 and the image editing unit 102$g$ performs editing on the test image and inputs the edited test image as a new test image (step SA-0). For example, when there is a small area that looks reddish due to illusion as in the case of the image number 5 described using FIG. 19, the image editing unit 102$g$ may increase the gradation value of a correction color for the small area to neutralize the redness or increase the difference in lightness between the small area and the surrounding area to cause lightness contrast. In this manner, the image editing unit 102$g$ may, for the area of the same color where the amount of illusion calculated by the illusion amount quantifying unit 102$f$ is equal to or more than a given value or an area of the same color neighboring that area, selectively change the color or lightness of the group of pixels belonging to the area. The image editing unit 102$g$ may cause the user to adjust the lightness and contrast of the image on the histogram of the image via the input device 112. The image editing unit 102$g$ may change the test image randomly using a known optimum method (fitting method). Using simulated annealing method or the like, the image editing unit 102$g$ may increase the amount of change if the amount of illusion of the color components, which is calculated by the illusion amount quantifying unit 102$f$, is large or reduce the amount of change if the amount of illusion is small.

The illusion analyzing apparatus 100 repeats the above-described processing at steps SA-1 to SA-6 on the test image that is re-input by the image editing unit 102$g$. In the repeated processing, the illusion amount quantifying unit 102$f$ calculates a difference in color components between the initial image data (not the re-input image data) and illusion image data that is generated from the re-input test image (step SA-5').

As described above, the illusion analyzing apparatus 100 corrects the test image such that the difference in color components is minimized. If it is determined that it is unnecessary to correct the test image data, i.e., if the amount of illusion is less than the given threshold (NO at step SA-6), the illusion analyzing apparatus 100 obtains, as an image for output, the test image eventually obtained and ends the fitting processing.

The obtained image for output is output, for example, printed out, displayed or painted, and a person who looks at the image for output perceives it in the brain as an image close to the initial image. In this manner, according to the embodiment, image editing is performed repeatedly such that the difference between the illusion image from the test image and the original initial image is minimized, so that the image for output that is perceived according to the initial image in consideration for the amount of illusion in the brain can be obtained and an adjustment on the color scheme depending on the expert techniques, which is conventionally performed, is unnecessary.

[Reverse Processing]

Exemplary reverse processing will be described in detail below. In the above-described embodiment, is mainly described calculation (forward processing) of an image perceived by human beings, i.e., an image where an illusion occurs, from an actual image in order for quantifying the illusion. The forward processing is processing in the same direction as that of the mathematical model of the brain.

On the other hand, processing for calculating an actual image according to the human perception obtained by looking at the image is referred to as reverse processing here. Because human beings causes illusion, colors that are not initially intended to be perceived are perceived; however, by using the reverse processing, it is possible to know which image of which colors should be shown in order to cause intended colors to be perceived.

The reverse processing of the present embodiment is not complete reverse conversion in a mathematical sense of the forward processing. In other words, even if reverse processing is performed on the output image from the forward processing, the image is not restored in a strict sense even if it is close to the original in an approximate sense. The reason for this is in the multiresolution decomposition using the wavelet frame with orientation selectivity or filter bank with orientation selectivity used in the present embodiment. For example, in the multiresolution decomposition using the pinwheel framelet, the signals obtained by applying non-linear processing to the subband signals in the decomposition phase does not match the subband signals in the decomposition phase obtained by re-decomposing the resultant output image via the synthesis phase. This applies also to multiresolution decomposition using other wavelet frames with orientation selectivity or filter banks with orientation selectivity, except for special cases (see, for example, Hitoshi Arai. Senkei Daisuu Kiso to Ouyou (Linear Algebra, Basics and Applications), Nippon Hyoron Sha Co., Ltd. (2006))

In the reverse processing, coefficient processing is performed on decomposition detail coefficients such that, the larger the energy of the decomposition detail coefficients is, the more small values are increased, and the smaller the energy of the decomposition detail coefficients is, the more small values are reduced. For example, when an SN function is used, the above-described coefficient processing can be performed by replacing the index of the SN function in the forward processing with an inverse. For example, in the above-descried [Example of Coefficient Processing], the above-described $b_1$, $b_2$, $b_3$ and $b_4$ are determined appropriately and the result of multiplying, by −1, the right hand side of the equation of the left hand side $\alpha_u[1,p]$ is replaced with $\alpha_u[1,p]$ again, so that a function for reverse processing can be obtained.

Figure 29:
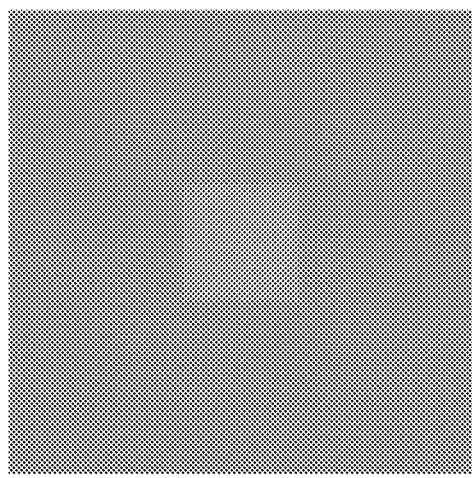
FIG. 29 is a diagram showing the original image used in the present example.
Figure 30:
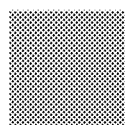
FIG. 30 is a diagram of the center small square part of the original image that is taken out.

FIG. 29 is an original image used in the present example and FIG. 30 is a diagram of the center square part that is taken out. The center small square part in FIG. 29 is colored with gray as shown in FIG. 30. However, due to color contrast illusion, it looks tinged with pink. In other words, even if FIG. 29 is presented to cause the gray small square to be perceived, the person who looks at it does not perceive it gray.

Figure 31:
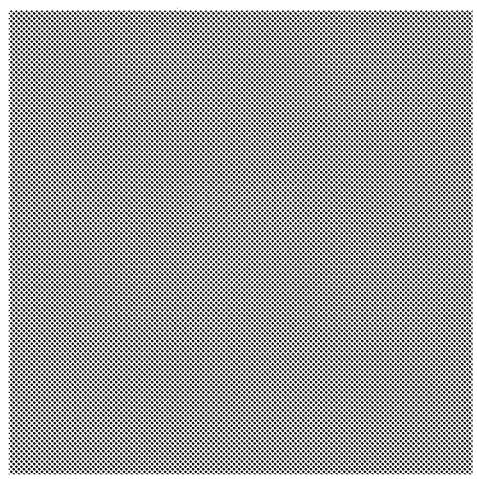
FIG. 31 is a diagram showing an illusion-considered image obtained as a reconstructed image by performing reverse processing.
Figure 32:
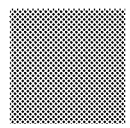
FIG. 32 is a diagram of the center small square part of the illusion-considered image that is taken out.

For this reason, reverse processing is performed on the original image of FIG. 29. FIG. 31 is an illusion-considered image that is obtained as a reconstructed image by performing the reverse processing and FIG. 32 is a diagram of the center small square part that is taken out. As shown in FIG. 31, the small square looks gray. In other words, it was confirmed that it looks in the color that is intended to be perceived in FIG. 30. The actual color of the small square in FIG. 31 is green close to gray as shown in FIG. 32. In this manner, it was confirmed that, according to the reverse processing, it is possible to design a color scheme such that the intended color that is intended to cancel the human visual illusion.

It can be seen that, when the colors of the small square parts in FIG. 30 and FIG. 31 are compared to each other, the color in FIG. 30 looks darker. This is because the background is white in FIG. 30 and accordingly color contrast illusion occurs.

Figure 33:
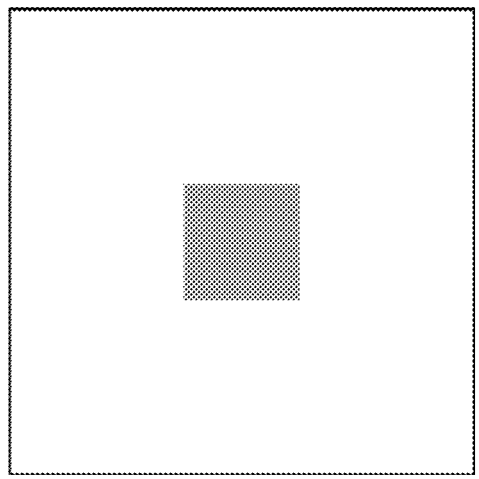
FIG. 33 is a diagram showing an image obtained by replacing the outer area of FIG. 29 with white.
Figure 34:
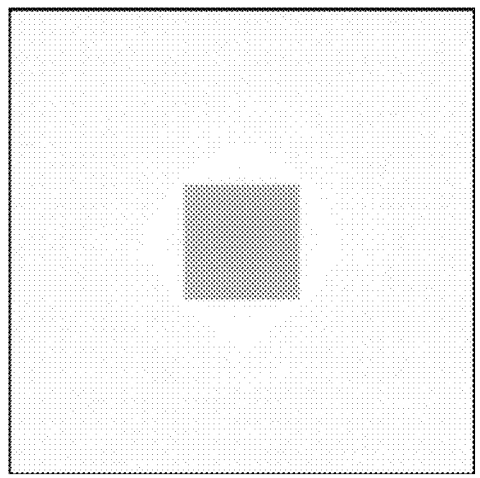
FIG. 34 is a diagram showing the illusion-considered image that is obtained as a reconstructed image by performing the reverse processing.

As shown in FIG. 33, the image obtained by replacing the outer area in FIG. 29 is replaced with white was prepared as an original image. In the same manner, the reverse processing is performed on the original image in FIG. 33. FIG. 34 is a diagram representing the illusion-considered image that is obtained as a reconstructed image by performing the reverse processing (the frame line is not included in the images in FIGS. 33 and 34).

It was confirmed that FIG. 34 obtained by performing the reverse processing on FIG. 33 is an image that looks in colors that are originally intended to be perceived in FIG. 30. It is shown that the small squares in FIGS. 31 and 34 are in the same color; however, actually, they are in different colors as it is shown when FIGS. 32 and 34 are compared to each other.

As described above, according to the present example, it was confirmed that it is possible to obtain an illusion-considered image that is perceived according to an original image in the human brain. Accordingly, it was shown that, for an arbitrary image, can be obtained an image for output that is perceived according to the arbitrary image in consideration for the amount of illusion in the brain with respect to darkness and lightness illusion and color contrast illusion that are considered to mainly result from the early visual information processing.

Figure 35:
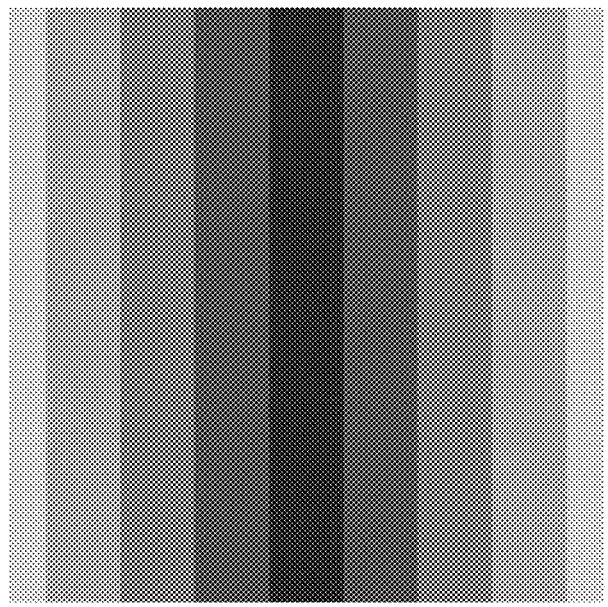
FIG. 35 is a diagram showing a Chevreul illusion pattern.

Here, as another example, an example where an image is generated that is to be perceived as if the amount of illusion is reduced by performing the reverse processing on the illusion image will be described. FIG. 35 is a diagram representing the Chevreul illusion pattern.

In the Chevreul illusion pattern in FIG. 35, while the color of each stripe is uniform, in the stripes on the left with respect to the center stripe, there seems to be light to dark gradation from the left stripe to the right. Particularly, the vicinity of the right edge of each stripe looks bright. As described above, in Chevreul illusion, gradations that do not originally exist are perceived.

Figure 36:
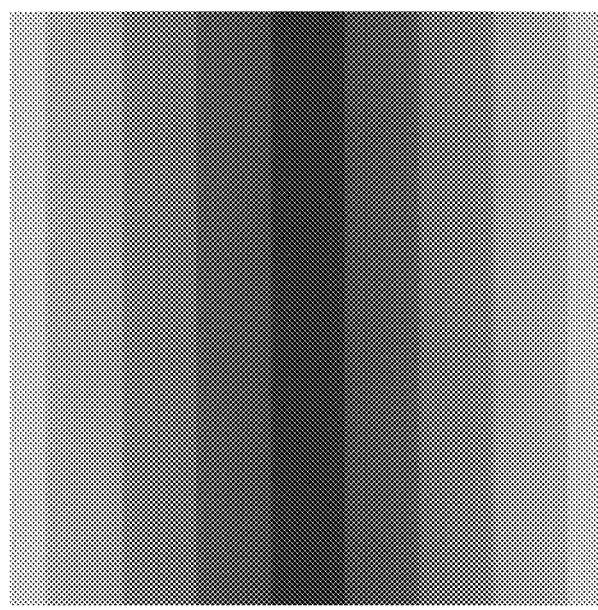
FIG. 36 is a diagram showing an illusion-considered image that is obtained by performing the reverse processing on the Chevreul illusion pattern.
Figure 37:
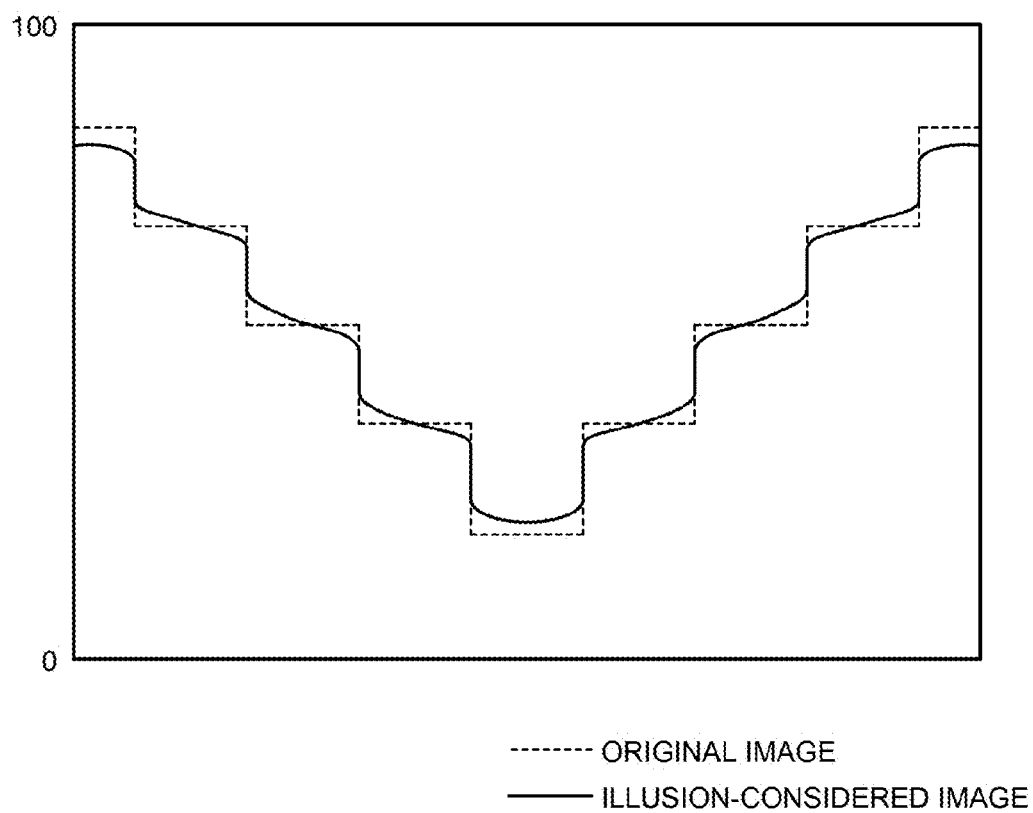
FIG. 37 is a graph of lightness (L* of CIELAB) at the cross section of the original image of the Chevreul illusion pattern in FIG. 35 and the illusion-considered image in FIG. 36.

Thus, the reverse processing according to the embodiment was performed on the Chevreul illusion pattern. FIG. 36 is a diagram representing an illusion-considered image that is obtained by performing the reverse processing on the Chevreul illusion pattern. As shown in FIG. 36, the Chevreul illusion is significantly reduced and gradations are hardly perceived. FIG. 37 is a graph of lightness (L* of CIELAB) at the cross section of the original image of the Chevreul illusion pattern shown in FIG. 35 and the illusion-considered image shown in FIG. 36. The dotted line represents the lightness of the original image and the solid line represents the lightness of the illusion-considered image.

As shown in FIG. 37, while the lightness of each stripe is uniform in the original image of FIG. 35 and the cross-sectional graph has the shape of steps, the illusion-considered image obtained by performing the reverse processing has gentle variations. This is because the amount of illusion to be added in the human brain is previously calculated for the illusion-considered image, and, in the actual human brain, as shown in FIG. 36, the amount of illusion is added and the lightness close to the original steps, i.e., with little gradation, is perceived.

In this manner, according to the present example, it was confirmed that the illusion-considered image that is obtained by performing the reverse processing on the illusion pattern with a relatively large amount of illusion is perceived according to the lightness and the tone close to those of the original image.

Accordingly, it was shown that such an illusion-considered image is used as an image for output and output for example, printed out, printed, displayed or painted, and accordingly a person who looks at the output image perceives the image according to the original image and an adjustment on the color scheme depending on the expert techniques, which is conventionally performed, can be automatically implemented using a computer, etc.

[Pinwheel Framelet]

The pinwheel framelet used as an example in the present embodiment may be, as described, a wavelet frame with orientation selectivity, such as the well-known simple pinwheel framelet or pinwheel wavelet frame, or a filter bank with orientation selectivity. A pinwheel framelet will be described below.

Suppose the degree n is odd and n≥3. Take an (n+1)×(n+1) symmetric matrix $A=(A_{k,l})$ satisfying that $A_{s,t}=A_{n-s,t}=A_{s,n-t}=A_{n-s,n-t}=s$ for s=0, 1, . . . , [n/2], and t=s, . . . , [n/2], where [ ] is the Gauss symbol.

If n=7, the following matrix satisfies the condition.

$$A = \begin{pmatrix} 0 & 0 & 0 & 0 & 0 & 0 & 0 & 0 \\ 0 & 1 & 1 & 1 & 1 & 1 & 1 & 0 \\ 0 & 1 & 2 & 2 & 2 & 2 & 1 & 0 \\ 0 & 1 & 2 & 3 & 3 & 2 & 1 & 0 \\ 0 & 1 & 2 & 3 & 3 & 2 & 1 & 0 \\ 0 & 1 & 2 & 2 & 2 & 2 & 1 & 0 \\ 0 & 1 & 1 & 1 & 1 & 1 & 1 & 0 \\ 0 & 0 & 0 & 0 & 0 & 0 & 0 & 0 \end{pmatrix}$$ [Expression 17]

If the matrix is given by $B=(B_{k,l}):(n+1)\times(n+1)$, B is a matrix satisfying the following condition (P).

$$\text{Conditions } (P): \begin{cases} B_{k,l} = B_{l,k} \\ B_{k,l} = B_{n-k,l} = B_{k,n-l} = B_{n-k,n-l} \\ B_{k,l} \geq 0 \end{cases}$$ [Expression 18]

$$n_0 = \left[\frac{n}{2}\right]$$

[Expression 19]

The number of free variables is $$\frac{1}{2}(n_0+1)(n_0+2).$$

$$F_{k,l}^1(\theta_1, \theta_2) = \frac{1}{2}|\det M|^{\frac{1}{2}} t^{k+l+A_{k,l}} e^{-\pi i \theta_1} e^{-\pi i \theta_2} \sqrt{B_{k,l}}$$
$$\cos^{n-k-A_{k,l}}(\pi x)\sin^{k-A_{k,l}}(\pi x) \times \cos^{n-l-A_{k,l}}(\pi y)$$
$$\sin^{l-A_{k,l}}(\pi y) \times (-\cos(\pi x)\sin(\pi x) + \cos(\pi y)\sin(\pi y))^{A_{k,l}}$$

[Expression 20]

$$F_{k,l}^2(\theta_1, \theta_2) = \frac{1}{2}|\det M|^{\frac{1}{2}} t^{k+l+A_{k,l}} e^{-\pi i \theta_1} e^{-\pi i \theta_2} \sqrt{B_{k,l}}$$
$$\cos^{n-k-A_{k,l}}(\pi x)\sin^{k-A_{k,l}}(\pi x) \times \cos^{n-l-A_{k,l}}(\pi y)$$
$$\sin^{l-A_{k,l}}(\pi y) \times (\cos(\pi x)\sin(\pi x) + \cos(\pi y)\sin(\pi y))^{A_{k,l}}$$

[Expression 21]

where M denotes a sampling matrix of a square lattice, a quincunx lattice, or a hexagonal lattice.

$$f_{k,1}^1 \leftrightarrow F_{k,1}^1; f_{k,1}^2 \leftrightarrow F_{k,1}^2$$

[Expression 22]

$$\Lambda_f = \{(0,0), (0,n), (n,0), (n,n)\}$$

$$\Lambda_g = \{(k,l)\}_{k=0,n;l=1,\ldots,n-1} \cup \{(k,l)\}_{l=0,n;k=1,\ldots,n-1}$$

$$\Lambda_a = \{(k,l)\}_{k=1,\ldots,n-1;l=1,\ldots,n-1}$$

[Expression 23]

$$P_n\{\sqrt{2}f_{k,1}^1\}_{(k,l)\in\Lambda_f\cup\Lambda_g} \cup \{f_{k,1}^1\}_{(k,1)\in\Lambda_a} \cup \{f_{k,1}^2\}_{(k,1)\in\Lambda_a}$$

[Expression 24]

Lemma 2 (H.&S. Arai, 2008)

The necessary and sufficient condition that $P_n$ be a framelet filter relating to a square lattice, a quincunx lattice, or a hexagonal lattice is that $B=(B_{k,1})$ satisfies the following condition.

$$\sum_{k=0}^{n}\sum_{l=0}^{n}\sum_{j=1}^{2}|F_{k,l}^j(\theta_1,\theta_2)|^2 \equiv |\det M|$$

[Expression 25]

<Method of Determining $B=(B_{k,1})$ Satisfying the Above Condition>

$\{(k,l): k=0, 1, \ldots, n_0, l=s, \ldots, n_0,\}$ is ordered as follows.

| (0, 0) | (0, 1) | (0, 2) | ⋯ | (0, $n_0-1$) | (0, $n_0$) |
|---|---|---|---|---|---|
|  | (1, 1) | (1, 2) | … | (1, $n_0-1$) | (1, $n_0$) |
|  |  |  | ⋱ | ⋮ | ⋮ |
|  |  |  |  | ($n_0-1, n_0-1$) | ($n_0-1, n_0$) |
|  |  |  |  |  | ($n_0, n_0$) |

[Expression 26]

↕

| 1 | 2 | 3 | … | $n_0$ | $n_0+1$ |
|---|---|---|---|---|---|
| $n_0+2$ | $n_0+3$ | … |  | $2n_0$ | $2n_0+1$ |
|  |  | ⋱ |  | ⋮ | ⋮ |
|  |  |  |  | $\frac{1}{2}n_0(n_0+3)-1$ | $\frac{1}{2}n_0(n_0+3)$ |
|  |  |  |  |  | $\frac{1}{2}n_0(n_0+1)(n_0+2)$ |

$\mu = (k, l), v = (k', l')$ $$K_{\mu,v} = 2^{3-4n+4k}(-1)^l \sum_{p=0}^{k}\left\{\binom{2k}{2p}\left[\left[\sum_{q=0}^{2k-2p}(-1)^q\binom{-2k-2p+2n}{2k'-2p+n-q}\binom{2k-2p}{q}\right]\times\right.\right.$$
$$\left[\sum_{q=0}^{2p+2l-2k}(-1)^q\binom{2p+2n-2k-2l}{2l'+2p+n-2k-q}\binom{2p+2l-2k}{q}\right]+$$
$$\left[\sum_{q=0}^{2k-2p}(-1)^q\binom{-2k-2p+2n}{2l'-2p+n-q}\binom{2k-2p}{q}\right]\times\left[\right.$$
$$\left.\left.\sum_{q=0}^{2p+2l-2k}(-1)^q\binom{2p+2n-2k-2l}{2k'+2p+n-2k-q}\binom{2p+2l-2k}{q}\right]\right\}$$

[Expression 27]

$$\begin{pmatrix} K_{1,1} & \cdots & K_{1,\frac{1}{2}(n_0+1)(n_0+2)} \\ \vdots & \ddots & \vdots \\ K_{\frac{1}{2}(n_0+1)(n_0+2),1} & \cdots & K_{\frac{1}{2}(n_0+1)(n_0+2),\frac{1}{2}(n_0+1)(n_0+2)} \end{pmatrix} \begin{pmatrix} X_1 \\ X_2 \\ \vdots \\ X_{\frac{1}{2}(n_0+1)(n_0+2)} \end{pmatrix} = \begin{pmatrix} 4 \\ 0 \\ \vdots \\ 0 \end{pmatrix}$$ [Expression 28]

$$B_{k,l} = \begin{cases} 2X_s & s = \frac{1}{2}(k-1)(2n_0 - k + 4) + 1, k = 1, \ldots, n_0 \\ X_s & etc. \end{cases}$$ [Expression 29]

Theorem 3 (H.&S. Arai, 2008)

Figure 38:
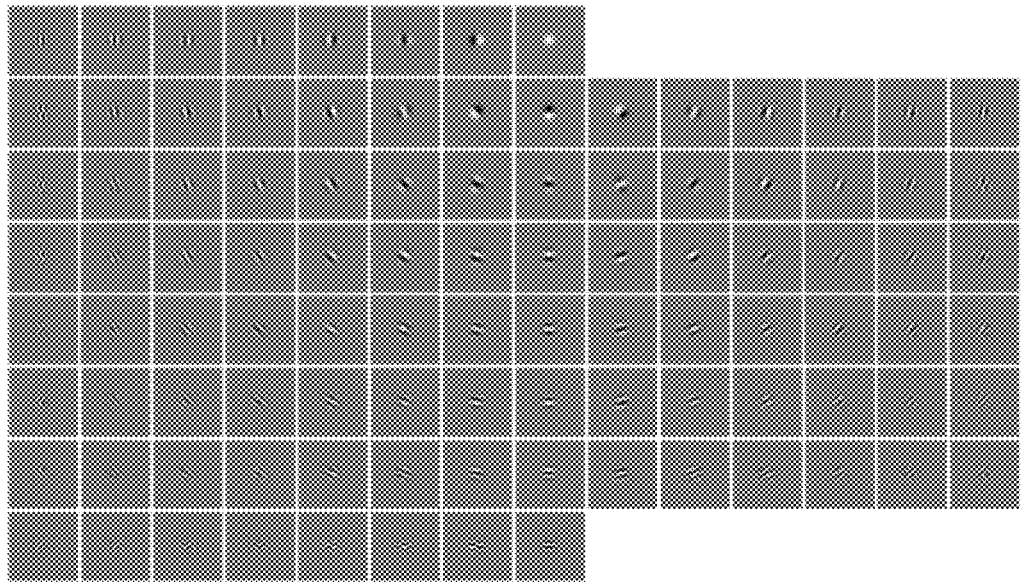
FIG. 38 is a diagram showing the filters that are obtained by calculating the cyclic correlation product of maximal overlap pinwheel framelet filters at level 2 of degree 7 and maximal overlap pinwheel framelet approximate filters at level 1.
Figure 39:
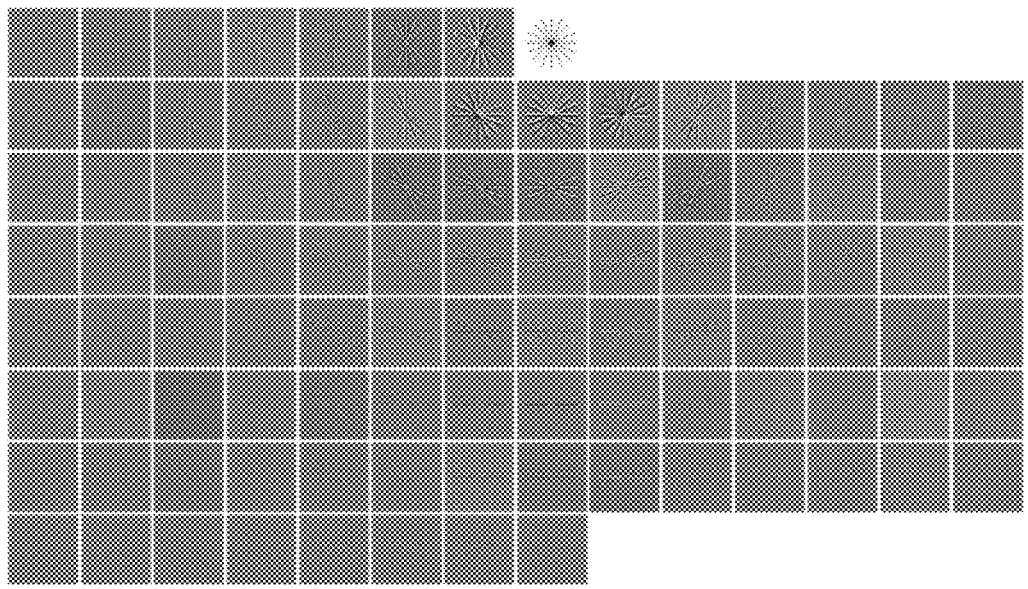
FIG. 39 is a diagram showing each sub-band signal obtained as a result of performing the 2nd stage of maximal overlap MRA decomposition by pinwheel framelet of degree 7.

$B=(B_{k,l})$ determined above satisfies Lemma 2. Therefore, $P_n$ is a framelet filter relating to a square lattice, a quincunx lattice, or a hexagonal lattice. $P_n$ is referred to as a pinwheel framelet of degree n. FIG. 38 is a diagram showing the filters that are obtained by calculating the cyclic correlation product of maximum overlap pinwheel framelet filters at level 2 and an approximate filter at level 1. FIG. 39 is a diagram showing each subband signal obtained as a result of performing the 2nd stage of maximal overlap MRA decomposition by pinwheel framelet on a test image.

Here is the end of the descriptions of the present embodiment. According to the present embodiment, can be provided an illusion analyzing apparatus, an illusion-considered image generating apparatus, an illusion analyzing method, an illusion-considered image generating method, a program, and a recording medium that make it possible to generate an image for which an amount of illusion that can occur on an arbitrary image is quantified or for which the amount of illusion is taken into consideration. Particularly, because color contrast illusions and illusion-considered images relate to how the colors of products, etc. look, they are extremely useful in industries (printing, design, video, painting, etc.) where colored products are manufactured and sold.

OTHER EMBODIMENTS

The embodiment of the present invention has been described above, and the present invention can be implemented by, in addition to the above-described embodiment, various different embodiments within the scope of the technical idea described in the claims.

For example, while examples have been given on the cases where the illusion analyzing apparatus 100 performs the processing in a stand-alone mode, the illusion analyzing apparatus 100 may perform the processing in response to a request from a client terminal (a housing independent of the illusion analyzing apparatus 100) and return the processing results to the client terminal. For example, the illusion analyzing apparatus 100 may be configured as an ASP server, may receive original image data transmitted from a user terminal via the network 300, and return reconstructed image data that is processed image based on the original image data to the user terminal.

Moreover, among the steps of the processing described in the embodiment, all or part of the steps of the processing described as automatic processing may be performed manually and all or part of the steps of the processing described as manual processing may be performed automatically by well-known methods.

In addition thereto, the processing procedures, the control procedures, the specific names, the information including registered data of each set of processing and parameters, such as retrieval conditions, the screen examples, and the database configurations, described in the literatures and drawings above may be arbitrarily modified unless otherwise indicated.

Furthermore, each component of the illusion analyzing apparatus 100 illustrated in the drawings is of functional concept, and is not necessarily configured physically the same as illustrated in the drawings.

For example, all or any part of the processing functions that the devices in the illusion analyzing apparatus 100 have, and particularly each processing function performed by the control unit 102, may be implemented by a CPU (Central Processing Unit) and a program interpreted and executed by the CPU, or may be implemented as hardware by wired logic. The program is recorded in a non-temporary computer-readable recording medium to be described below containing programmed instructions for causing the computer to implement the methods according to the present invention and is mechanically read by the illusion analyzing apparatus 100 as necessary. Specifically, the storage unit 106, such as a ROM and an HDD (Hard Disk Drive), or the like records a computer program for providing instructions to the CPU in cooperation with the OS (Operating System) and for executing various types of processing. This computer program is downloaded into a RAM and accordingly executed to configure the control unit in cooperation with the CPU.

Moreover, this computer program may be stored in an application program server that is connected to the illusion analyzing apparatus 100 via the arbitrary network 300, and all or part thereof may be downloaded as necessary.

Furthermore, the program according to the present invention may be stored in a computer-readable recording medium and may be configured as a program product. The "recording medium" includes any "portable physical medium", such as a memory card, a USB memory, an SD card, a flexible disk, a magneto-optical disk, a ROM, an EPROM, an EEPROM, a CD-ROM, an MO, a DVD, and a Blu-ray Disc.

Moreover, the "program" refers to a data processing method written in any language and any description method, and is not limited to a specific format, such as source codes and binary codes. The "program" is not necessarily configured unitarily and includes a program constituted in a dispersed manner as a plurality of modules and libraries and a program that implements its functions in cooperation with a different program representative of which is an OS (Operating System). Well-known configurations and procedures can be used for the specific configuration and reading procedure for reading a recording medium, the installation procedure after the reading, and the like in each device illustrated in the embodiment.

Various databases and the like (the framelet file 106a and the image data file 106b) stored in the storage unit 106 are each a storage unit, examples of which are a memory device, such as a RAM or a ROM, a fixed disk drive, such as a hard disk, a flexible disk, and an optical disk, and stores therein various programs, tables, databases, files for web pages, and the like that are used for various types of processing or providing websites.

Moreover, the illusion analyzing apparatus 100 may be configured as an information processing apparatus, such as a well-known personal computer or workstation, or may be configured by connecting any peripheral device to the information processing apparatus. Moreover, the illusion analyzing apparatus 100 may be realized by installing software (including program and data) that causes the information processing apparatus to implement the method of the present invention.

Furthermore, specific modes of distribution/integration of the devices are not limited to those illustrated in the drawings, and all or a part thereof can be configured by functionally or physically distributing or integrating them in any unit according to, for example, various additions, or according to functional loads. In other words, the above-described embodiments may be implemented by combining them arbitrarily, or the embodiments may be selectively performed.

REFERENCE SIGNS LIST

100 Illusion analyzing apparatus
102 Control unit
102a Decomposing unit
102b Coefficient processing unit
102c Reconstructing unit
102d Color space converting unit
102e Processed image output unit
102f Illusion amount quantifying unit
102g Image editing unit
104 Communication control interface unit
106 Storage unit
106a Framelet file
106b Image data file
108 Input/output control interface unit
112 Input device
114 Output device
200 External system
300 Network

The invention claimed is:

1. An illusion analyzing apparatus comprising at least a storage unit and a control unit,
the storage unit comprising:
a filter storage unit that stores a wavelet frame with orientation selectivity or a filter bank with orientation selectivity that is a set of an approximate filter with no orientation and a plurality of detail filters with respective orientations; and
an image data storage unit that stores image data; and the control unit comprising:
a decomposing unit that performs multiresolution decomposition on a color component of the image data by using the wavelet frame with orientation selectivity or the filter bank with orientation selectivity and obtains subband signals;
a reconstructing unit that reconstructs an image by summing the subband signals that are obtained by the decomposing unit and obtains reconstructed image data; and
an illusion quantifying unit that quantifies an amount of illusion by calculating a ratio or difference in the color component between the image data and the reconstructed image data; and
the decomposing unit further including a coefficient processing unit that performs, between a decomposition phase and a synthesis phase in the multiresolution decomposition, coefficient processing on decomposition detail coefficients that are output from the decomposition phase such that the larger the energy of the decomposition detail coefficients is, the more small values are further reduced, and the smaller the energy of the decomposition detail coefficients is, the more small values are increased, wherein
the coefficient processing unit performs, in a color space including lightness and color like human color-perception, for color components of color of the image data, the coefficient processing that is corrected such that the larger the energy that is determined from the decomposition detail coefficients of color and the decomposition detail coefficients of lightness is, the more small values are further reduced, and the smaller the energy is, the more small values are increased.

2. The illusion analyzing apparatus according to claim 1, wherein the coefficient processing unit performs independent processing according to a difference in the sign of the decomposition detail coefficients.

3. The illusion analyzing apparatus according to claim 1, wherein the color component is any one of L*, a* and b* of a CIELAB color space.

4. The illusion analyzing apparatus according to claim 3, wherein the illusion amount quantifying unit calculates the amount of illusion by using a color difference that is a square-root of sum of squares of differences in the values of L*, a* and b* between the image data and the reconstructed image data.

5. The illusion analyzing apparatus according to claim 3, wherein the coefficient processing unit performs, for color components of a* and/or b* of the image data, the coefficient processing that is corrected such that the larger the energy that is determined from the decomposition detail coefficients of a* and/or b* and the decomposition detail coefficients of L* is, the more small values are further reduced, and the smaller the energy is, the more small values are increased.

6. The illusion analyzing apparatus according to claim 1, wherein the coefficient processing unit performs the coefficient processing using a function that automatically varies continuously in an S-shaped curve when the energy of the decomposition detail coefficients is large, and in an N-shaped curve when the energy is small.

7. The illusion analyzing apparatus according to claim 1, wherein the coefficient processing unit normalizes, between the decomposition phase and the synthesis phase, the decomposition detail coefficients, uses, as the energy, a norm of normalized decomposition detail coefficients that are obtained by normalizing the decomposition detail coefficients, performs the coefficient processing on the normalized decomposition detail coefficients, and performs inverse operations of the normalization on the normalized decomposition detail coefficients on which the coefficient processing has been performed.

8. The illusion analyzing apparatus according to claim 1, wherein the decomposing unit performs the multiresolution decomposition using a biorthogonal wavelet filter bank with horizontal, vertical and diagonal orientations or a pinwheel framelet with multiple orientations.

9. The illusion analyzing apparatus according to claim 1, wherein the decomposing unit uses another filter bank by at least changing the degree of the pinwheel framelet according to the level.

10. The illusion analyzing apparatus according to claim 1, wherein the multiresolution decomposition performed by the decomposing unit is maximal overlap multiresolution decomposition, maximally decimated multiresolution decomposition, or partially decimated and partially overlapping multiresolution decomposition.

11. The illusion analyzing apparatus according to claim 1, wherein
the control unit further comprises an image editing unit that edits the image data and performs control such that the decomposing unit performs the multiresolution decomposition on
the edited image data, the illusion amount quantifying unit calculates, as the amount of illusion, a ratio or difference between the reconstructed image data obtained from the edited image data and the image data that is unedited, and
the image editing unit repeatedly performs editing such that the amount of illusion is reduced.

12. The illusion analyzing apparatus according claim 1, wherein
the control unit further comprises an image editing unit that edits the image data and performs control such that the decomposing unit performs the multiresolution decomposition on the edited image data,
the illusion amount quantifying unit calculates, as the amount of illusion, a ratio or difference between the edited image data and the reconstructed image data obtained from the edited image data, and
the image editing unit repeatedly performs editing such that the amount of illusion is at a given numerical value.

13. An illusion-considered image generating apparatus comprising at least a storage unit and a control unit,
the storage unit comprising:
a filter storage unit that stores a wavelet frame with orientation selectivity or a filter bank with orientation selectivity that is a set of an approximate filter with no orientation and a plurality of detail filters with respective orientations; and
an image data storage unit that stores image data; and the control unit comprising:
a decomposing unit that performs multiresolution decomposition on the image data by using the wavelet frame with orientation selectivity or the filter bank with orientation selectivity and obtains subband signals; and
a reconstructing unit that reconstructs an image by summing the subband signals that are obtained by the decomposing unit and obtains reconstructed image data; and
the decomposing unit further including a coefficient processing unit that performs, between a decomposition phase and a synthesis phase in the multiresolution decomposition, coefficient processing on decomposition detail coefficients that are output from the decomposition phase such that the larger the energy of the decomposition detail coefficients is, the more small values are increased, and the smaller the energy of the decomposition detail coefficients is, the more small values are further reduced.

14. The illusion-considered image generating apparatus according to claim 13, wherein the coefficient processing unit performs independent processing according to a difference in the sign of the decomposition detail coefficients.

15. The illusion-considered image generating apparatus according to claim 13, wherein a color component of the image data is any one of L*, a* and b* of a CIELAB color space.

16. The illusion-considered image generating apparatus according to claim 15, wherein the coefficient processing unit performs, for color components of a* and/or b* of the image data, the coefficient processing that is corrected such that the larger the energy that is determined from the decomposition detail coefficients of a* and/or b* and the decomposition detail coefficients of L* is, the more small values are increased, and the smaller the energy is, the more small values are further reduced.

17. The illusion-considered image generating apparatus according to claim 13, wherein the coefficient processing unit performs the coefficient processing using a function that automatically varies continuously in an N-shaped curve when the energy of the decomposition detail coefficients is large, and in an S-shaped curve when the energy of the decomposition detail coefficients is small.

18. The illusion-considered image generating apparatus according to claim 13, wherein the coefficient processing unit normalizes, between the decomposition phase and the synthesis phase, the decomposition detail coefficients, uses, as the energy, a norm of normalized decomposition detail coefficients that are obtained by normalizing the decomposition detail coefficients, performs the coefficient processing on the normalized decomposition detail coefficients, and performs inverse operations of the normalization on the normalized decomposition detail coefficients on which the coefficient processing has been performed.

19. The illusion-considered image generating apparatus according to claim 13, wherein the decomposing unit performs the multiresolution decomposition using a biorthogonal wavelet filter bank with horizontal, vertical and diagonal orientations or a pinwheel framelet with multiple orientations.

20. The illusion-considered image generating apparatus according to claim 13, wherein the decomposing unit uses another filter bank by at least changing the degree of the pinwheel framelet.

21. The illusion-considered image generating apparatus according to claim 13, wherein the multiresolution decomposition performed by the decomposing unit is maximal overlap multiresolution decomposition, maximally decimated multiresolution decomposition, or partially decimated and partially overlapping multiresolution decomposition.

22. An illusion analyzing method performed by an illusion analyzing apparatus comprising at least a storage unit and a control unit,
the storage unit comprising:
a filter storage unit that stores a wavelet frame with orientation selectivity or a filter bank with orientation selectivity that is a set of an approximate filter with no orientation and a plurality of detail filters with respective orientations; and
an image data storage unit that stores image data; and
the illusion analyzing method being performed by the control unit, the illusion analyzing method comprising: a decomposing step of performing multiresolution decomposition on a color component of the image data by using the wavelet frame with orientation selectivity or the filter bank with orientation selectivity and obtaining subband signals;
a reconstructing step of reconstructing an image by summing the subband signals that are obtained at the decomposing step and obtaining reconstructed image data; and
an illusion quantifying step of quantifying an amount of illusion by calculating a ratio or difference in the color component between the image data and the reconstructed image data; and
the decomposing step further including a coefficient processing step of performing, between a decomposition phase and a synthesis phase in the multiresolution decomposition, coefficient processing on decomposition detail coefficients that are output from the decomposition phase such that the larger the energy of the decomposition detail coefficients is, the more small values are further reduced, and the smaller the energy of the decomposition detail coefficients is, the more small values are increased, wherein the coefficient processing step includes performing, in a color space including lightness and color like human color-perception, for color components of color of the image data, the coefficient processing that is corrected such that the larger the energy that is determined from the decomposition detail coefficients of color and the decomposition detail coefficients of lightness is, the more small values are further reduced, and the smaller the energy is, the more small values are increased.

23. An illusion-considered image generating method performed by an illusion-considered image generating apparatus comprising at least a storage unit and a control unit, the storage unit comprising:

a filter storage unit that stores a wavelet frame with orientation selectivity or a filter bank with orientation selectivity that is a set of an approximate filter with no orientation and a plurality of detail filters with respective orientations; and an image data storage unit that stores image data; and the illusion-considered image generating method being performed by the control unit, the illusion-considered image generating method comprising:

a decomposing step of performing multiresolution decomposition on the image data by using the wavelet frame with orientation selectivity or the filter bank with orientation selectivity and obtaining subband signals; and a reconstructing step of reconstructing an image by summing the subband signals that are obtained at the decomposing step and obtaining reconstructed image data; and the decomposing step further including a coefficient processing step of performing, between a decomposition phase and a synthesis phase in the multiresolution decomposition, coefficient processing on decomposition detail coefficients that are output from the decomposition phase such that the larger the energy of the decomposition detail coefficients is, the more small values are increased, and the smaller the energy of the decomposition detail coefficients is, the more small values are further reduced.

24. A non-transitory computer-readable medium comprising computer-readable program codes, performed by an illusion analyzing apparatus comprising at least a storage unit and a control unit, the storage unit comprising:

a filter storage unit that stores a wavelet frame with orientation selectivity or a filter bank with orientation selectivity that is a set of an approximate filter with no orientation and a plurality of detail filters with respective orientations; and an image data storage unit that stores image data; and the program codes when executed causing the control unit to execute:

a decomposing step of performing multiresolution decomposition on a color component of the image data by using the wavelet frame with orientation selectivity or the filter bank with orientation selectivity and obtaining subband signals;

a reconstructing step of reconstructing an image by summing the subband signals that are obtained at the decomposing step and obtaining reconstructed image data; and an illusion quantifying step of quantifying an amount of illusion by calculating a ratio or difference in the color component between the image data and the reconstructed image data; and the decomposing step further including a coefficient processing step of performing, between a decomposition phase and a synthesis phase in the multiresolution decomposition, coefficient processing on decomposition detail coefficients that are output from the decomposition phase such that the larger the energy of the decomposition detail coefficients is, the more small values are further reduced, and the smaller the energy of the decomposition detail coefficients is, the more small values are increased, wherein the coefficient processing step includes performing, in a color space including lightness and color like human color-perception, for color components of color of the image data, the coefficient processing that is corrected such that the larger the energy that is determined from the decomposition detail coefficients of color and the decomposition detail coefficients of lightness is, the more small values are further reduced, and the smaller the energy is, the more small values are increased.

25. A non-transitory computer-readable medium comprising computer-readable program codes, performed by an illusion-considered image generating apparatus comprising at least a storage unit and a control unit, the storage unit comprising:

a filter storage unit that stores a wavelet frame with orientation selectivity or a filter bank with orientation selectivity that is a set of an approximate filter with no orientation and a plurality of detail filters with respective orientations; and an image data storage unit that stores image data; and the program codes when executed causing the control unit to execute:

a decomposing step of performing multiresolution decomposition on the image data by using the wavelet frame with orientation selectivity or the filter bank with orientation selectivity and obtaining subband signals; and a reconstructing step of reconstructing an image by summing the subband signals that are obtained at the decomposing step and obtaining reconstructed image data; and the decomposing step further including a coefficient processing step of performing, between a decomposition phase and a synthesis phase in the multiresolution decomposition, coefficient processing on decomposition detail coefficients that are output from the decomposition phase such that the larger the energy of the decomposition detail coefficients is, the more small values are increased, and the smaller the energy of the decomposition detail coefficients is, the more small values are further reduced.

* * * * *